US010015398B2

(12) United States Patent
Takagi

(10) Patent No.: US 10,015,398 B2
(45) Date of Patent: Jul. 3, 2018

(54) IMAGE CAPTURING APPARATUS AND IMAGE CAPTURING METHOD

(71) Applicant: SONY CORPORATION, Tokyo (JP)

(72) Inventor: Hideo Takagi, Saitama (JP)

(73) Assignee: SONY CORPORATION, Tokyo (JP)

( * ) Notice: Subject to any disclaimer, the term of this patent is extended or adjusted under 35 U.S.C. 154(b) by 732 days.

(21) Appl. No.: 14/592,172

(22) Filed: Jan. 8, 2015

(65) Prior Publication Data

US 2015/0207995 A1 Jul. 23, 2015

(30) Foreign Application Priority Data

Jan. 17, 2014 (JP) .................................. 2014-006569

(51) Int. Cl.
*H04N 5/228* (2006.01)
*H04N 5/232* (2006.01)

(52) U.S. Cl.
CPC ....... *H04N 5/23254* (2013.01); *H04N 5/2328* (2013.01); *H04N 5/23258* (2013.01); *G03B 2205/0038* (2013.01); *G03B 2217/002* (2013.01)

(58) Field of Classification Search
CPC ............. H04N 5/23248; H04N 5/2329; H04N 3/1562; H04N 5/23254; H04N 5/23287; H04N 5/23258; H04N 5/23267; H04N 5/2254; H04N 5/23293; H04N 5/2257; G06T 7/20; G06T 7/2093; G09G 2320/106; G06K 2017/0045; G08B 13/19608; G08B 13/19606; G02B 27/646; G03B 2205/0069; G03B 2205/0015; G03B 2205/0007

See application file for complete search history.

(56) References Cited

U.S. PATENT DOCUMENTS

| 5,708,864 A * | 1/1998 | Katayama ................ G03B 5/00 396/155 |
| 5,771,404 A * | 6/1998 | Katayama ................ G03B 5/00 396/52 |
| 5,845,156 A * | 12/1998 | Onuki .................. G02B 27/646 348/208.11 |
| 9,507,170 B2 * | 11/2016 | Imada .................. G02B 27/646 |

(Continued)

FOREIGN PATENT DOCUMENTS

JP         2011-135285 A        7/2011

*Primary Examiner* — Chia-Wei A Chen
(74) *Attorney, Agent, or Firm* — Chip Law Group

(57) ABSTRACT

There is provided an image capturing apparatus including a positioning adjustment mechanism for performing positioning adjustment of an area image-captured by an image capturing unit; an image processing unit for recognizing a subject using an image signal generated in the image capturing unit; a vibration detection unit for detecting vibration of the image capturing apparatus; a control unit for determining a priority order of subject tracking processing for driving the positioning adjustment mechanism based on a subject recognition result provided from the image processing unit and image vibration correction processing for driving the positioning adjustment mechanism based on a vibration detection result of the vibration detection unit, and for limiting an adjustment amount of the positioning adjustment mechanism for the processing having no priority. Also, an image capturing method thereof and a program therefor are provided.

17 Claims, 13 Drawing Sheets

(56) References Cited

U.S. PATENT DOCUMENTS

| | | | |
|---|---|---|---|
| 2004/0052513 A1* | 3/2004 | Ohkawara | H04N 5/23248 396/55 |
| 2005/0128309 A1* | 6/2005 | Tomita | H04N 5/23248 348/208.7 |
| 2007/0098381 A1* | 5/2007 | Oshima | H04N 3/1575 396/52 |
| 2007/0291114 A1* | 12/2007 | Oshima | H04N 5/23248 348/126 |
| 2009/0003813 A1* | 1/2009 | Ohishi | H04N 5/23248 396/55 |
| 2009/0034076 A1* | 2/2009 | Suzui | G02B 27/646 359/557 |
| 2009/0096871 A1* | 4/2009 | Kuwano | G06K 9/00228 348/169 |
| 2009/0208194 A1* | 8/2009 | Honjo | G03B 17/14 396/55 |
| 2009/0225174 A1* | 9/2009 | Handa | H04N 5/23248 348/208.3 |
| 2010/0194897 A1* | 8/2010 | Yumiki | G03B 7/091 348/208.4 |
| 2013/0044229 A1* | 2/2013 | Noguchi | H04N 5/23245 348/208.6 |
| 2013/0202158 A1* | 8/2013 | Nakao | G06T 7/20 382/107 |
| 2014/0186017 A1* | 7/2014 | Shibata | H04N 5/23248 396/55 |
| 2014/0218564 A1* | 8/2014 | Tomosada | G02B 7/102 348/231.6 |
| 2014/0247367 A1* | 9/2014 | Kusaka | G03B 5/00 348/188 |
| 2014/0354834 A1* | 12/2014 | Narita | H04N 5/23264 348/208.4 |
| 2015/0195460 A1* | 7/2015 | Yasuda | G02B 27/646 348/208.11 |
| 2017/0013180 A9* | 1/2017 | Sugaya | H04N 5/2327 |

* cited by examiner

IMAGE CAPTURING APPARATUS AND IMAGE CAPTURING METHOD

CROSS REFERENCE TO RELATED APPLICATIONS

This application claims the benefit of Japanese Priority Patent Application JP 2014-006569 filed Jan. 17, 2014, the entire contents of which are incorporated herein by reference.

BACKGROUND

The present technology relates to an image capturing apparatus, an image capturing method and a program configured to provide a good quality captured image.

In the related art, a variety of image capturing apparatuses each having a subject tracking function has been proposed. For example, Japanese Patent Application Laid-open No. 2011-135285 discloses an image capturing apparatus for detecting and tracking a target area satisfying the predetermined conditions on a moving picture image captured. According to the image capturing apparatus, when the target area being tracked is moved to outside of the image or is positioned at an end of the image on the moving picture image, a direction image-captured by an image capturing unit is changed depending on the movement or the position of the target area. The image-captured direction is changed by utilizing an image vibration correction mechanism.

The image vibration correction mechanism has a limited possible correction amount (a limited possible correction range). When the subject tracking and the image vibration correction are performed by using the image vibration correction mechanism, the possible correction amount is exhausted due to the subject tracking and the image vibration correction may be suddenly ineffective. For example, when the scene where the subject is moved actively is captured (such as a sports day or succor), the possible correction amount is exhausted due to the subject tracking and the image vibration correction becomes suddenly ineffective, which may result in a poor quality captured image.

It is desirable to provide an image capturing apparatus, an image capturing method and a program configured to provide a good quality captured image when the subject tracking and the image vibration correction are performed.

According to an embodiment of the present technology, there is provided an image capturing apparatus, including:

a positioning adjustment mechanism for performing positioning adjustment of an area image-captured by an image capturing unit;

an image processing unit for recognizing a subject using an image signal generated in the image capturing unit;

a vibration detection unit for detecting vibration of the image capturing apparatus;

a control unit for determining a priority order of subject tracking processing for driving the positioning adjustment mechanism based on a subject recognition result provided from the image processing unit and image vibration correction processing for driving the positioning adjustment mechanism based on a detection result of the vibration detection unit, and for limiting an adjustment amount of the positioning adjustment mechanism for the processing having no priority.

According to the present technology, the positioning adjustment mechanism adjusts at least either of an image capturing direction of the image capturing optical system or a relative position between a subject optical image and the image capturing area in the image capturing unit generating the image signal based on the subject optical image, whereby a subject tracking and an image vibration correction are possible. In the image processing unit, the subject is recognized using the image signal generated in the image capturing unit. In the vibration detection unit, the vibration of the image capturing apparatus is detected.

The control unit determines the priority order of the subject tracking processing and the image vibration correction processing, and gives a priority to processing with a less movement within the captured image provided by the image capturing unit, for example. The control unit gives a priority to the image vibration correction processing when the zoom position of the image capturing optical system is on a wider angle side than a predetermined position, when the target subject recognized is not of a predetermined size or more within the captured image, when a moving speed of the subject target calculated based on the speed of the target subject within the captured image and a speed in a subject tracking direction detected at the vibration detection unit is not a predetermined moving speed or less.

The control unit gives priority to the subject tracking processing taking the subject to be tracked as a background subject recognized at the image processing unit at least one of the cases when the zoom position of the image capturing optical system is on the wider angle side than a predetermined position, when the target subject is not recognized at the image processing unit, when the target subject is not of a predetermined size or more and when the target subject does not have a predetermined moving speed or less. The control unit limits the adjustment amount of the positioning adjustment mechanism to the subject tracking processing having no priority based on a determination result of the processing having the priority. The control unit assigns the possible adjustment amount of the positioning adjustment mechanism used in the processing having the priority and assigns the rest of the possible adjustment amount for the other processing such that the positioning adjustment amount of the positioning adjustment mechanism is limited to the processing having no priority.

The control unit performs a limiting processing to a subject tracking amount in the subject tracking processing or an image vibration correction amount in the image vibration correction processing to limit the adjustment amount of the positioning adjustment mechanism to a possible adjustment amount assigned, and drive the positioning adjustment mechanism based on a combined result of the subject tracking amount and the image vibration correction amount after the limiting processing or a combined result of the image vibration correction amount and the subject tracking amount after the limiting process. The control unit displays discrimination threshold information that adjustment limit of the positioning adjustment mechanism is discriminable.

According to another embodiment of the present technology, there is provided a method of capturing an image, including:

performing positioning adjustment of an area image-captured by an image capturing unit of a positioning adjustment mechanism;

recognizing a subject using an image signal generated in the image capturing unit by an image processing unit;

detecting vibration by a vibration detection unit;

determining a priority order of subject tracking processing for driving the positioning adjustment mechanism based on a subject recognition result and image vibration correction processing for driving the positioning adjustment mechanism based on a vibration detection result, and for limiting an adjustment amount of the positioning adjustment mechanism for the processing having no priority by a control unit.

According to still another embodiment of the present technology, there is provided a program for causing a computer to execute a process, including:

performing positioning adjustment of an area image-captured by an image capturing unit of a positioning adjustment mechanism; and determining a priority order of subject tracking processing for driving the positioning adjustment mechanism based on a subject recognition result provided from the image processing unit using an image signal generated in the image capturing unit and image vibration correction processing for driving the positioning adjustment mechanism based on a vibration detection result of the vibration detection unit, and for limiting an adjustment amount of the positioning adjustment mechanism for the processing having no priority.

The program according to the embodiment of the present technology can be provided to a general purpose computer that can execute a variety of program codes by a recording medium provided in a computer readable format, a communication medium such as an optical disk and a magnetic disk, a recording medium such as a semiconductor memory or a communication medium such as a network. When the program is provided in the computer readable format, the processing corresponding to the program can be performed on the computer.

According to the embodiment of the present technology, the positioning adjustment mechanism performs the positioning adjustment of the area image-captured by the image capturing unit. In addition, a priority order of subject tracking processing for driving the positioning adjustment mechanism based on a subject recognition result provided from the image processing unit and image vibration correction processing for driving the positioning adjustment mechanism based on a detection result of the vibration detection unit is determined and an adjustment amount of the positioning adjustment mechanism for the processing having no priority is limited. Accordingly, as the adjustment amount of the positioning adjustment mechanism is limited to the subject tracking processing when the image vibration correction has priority, the image vibration correction is possible even if the subject tracking reaches the adjustment limit. When the subject tracking reaches the adjustment limit, the image vibration correction becomes suddenly ineffective, which results in a poor quality captured image. It is thus possible to avoid such phenomenon.

These and other objects, features and advantages of the present technology will become more apparent in light of the following detailed description of best mode embodiments thereof, as illustrated in the accompanying drawings.

DETAILED DESCRIPTION OF EMBODIMENTS

Hereinafter, an embodiment of the present technology will be described with reference to the drawings.

The embodiments of the present technology will be described in the following order:
1. Appearance Illustration of Image Capturing Apparatus
2. Configuration and Operation of Image Positioning Adjustment Apparatus
3. Configuration of Image Capturing Apparatus
4. Operation of Image Capturing Apparatus
   4-1. Other Operation of Priority Processing Determination
   4-2. Other Operation of Priority Processing Determination
5. Other Operation of Image Capturing Apparatus
6. Tracking Support Operation <1. Appearance Illustration of Image Capturing Apparatus>

Figure 1:
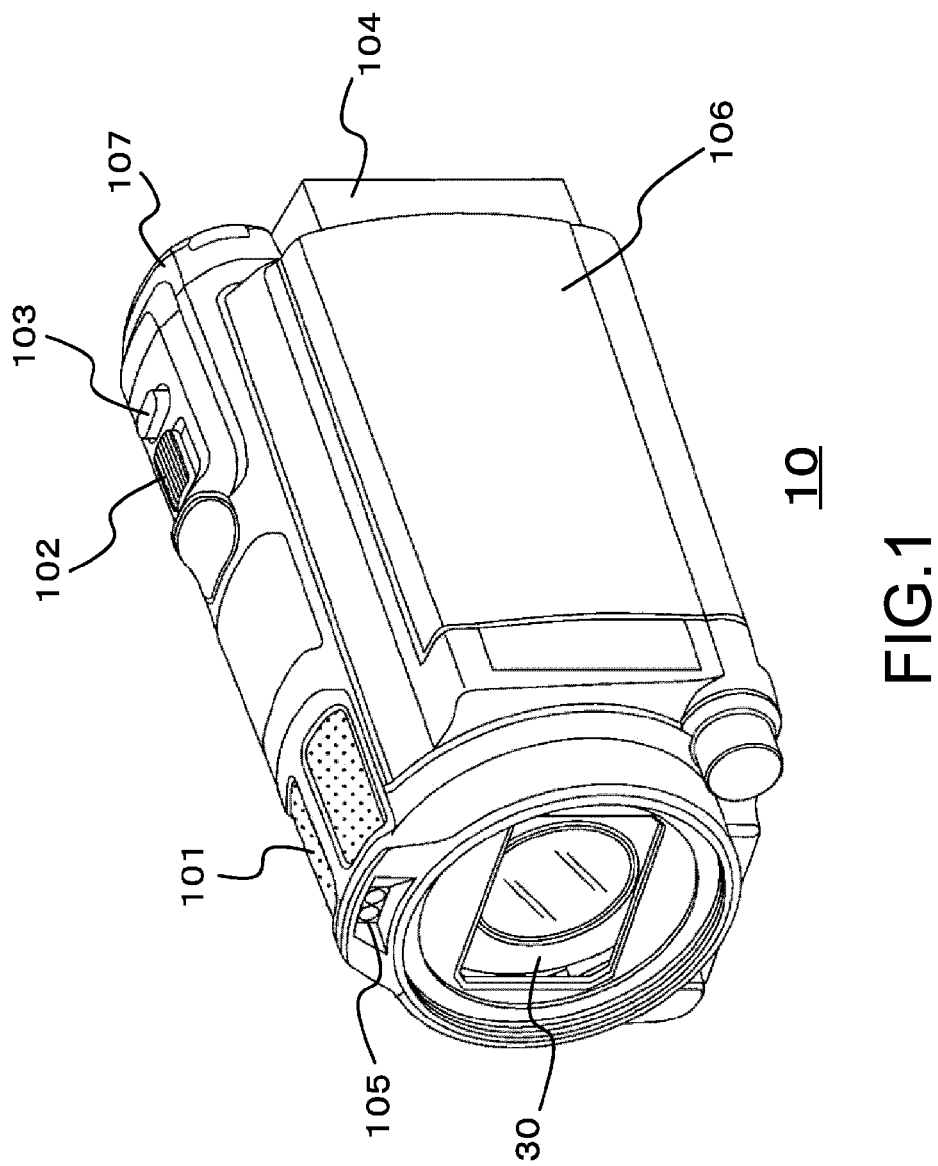
FIG. 1 is a diagram illustrating an appearance of an image capturing apparatus.
Figure 2:
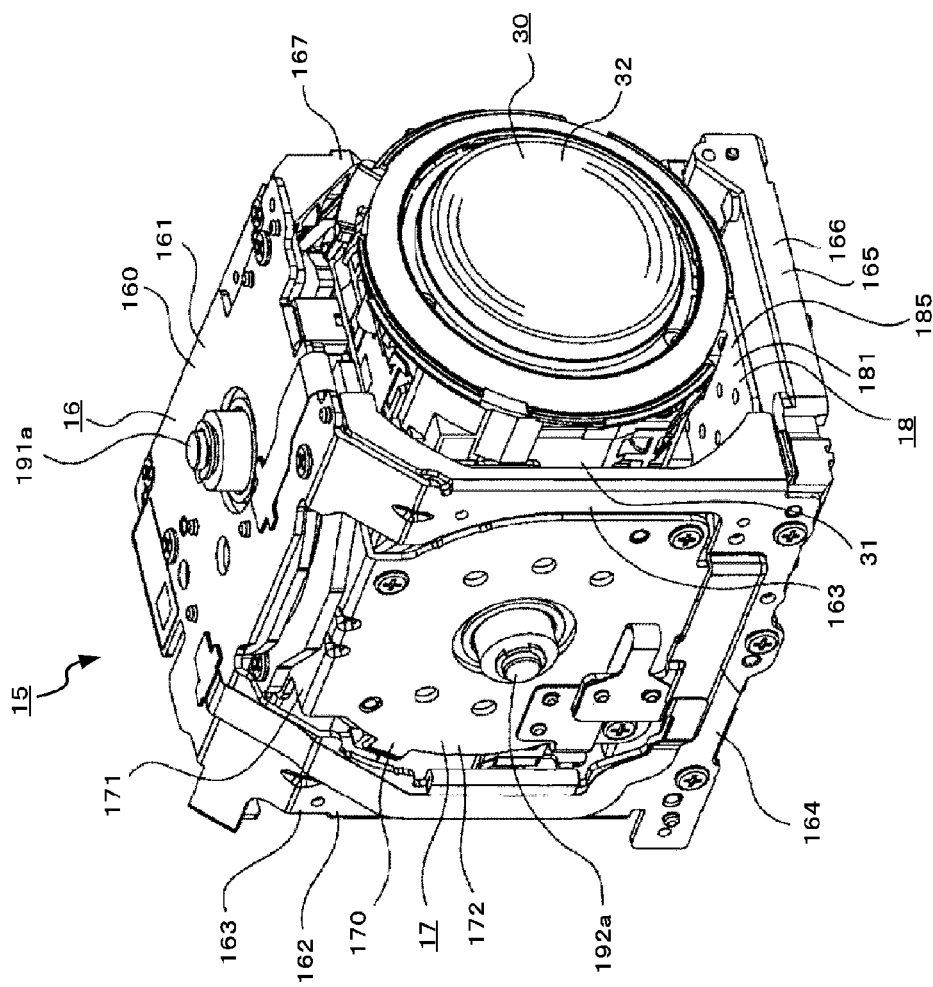
FIG. 2 is a perspective diagram of a gimbal mechanism.
Figure 3:
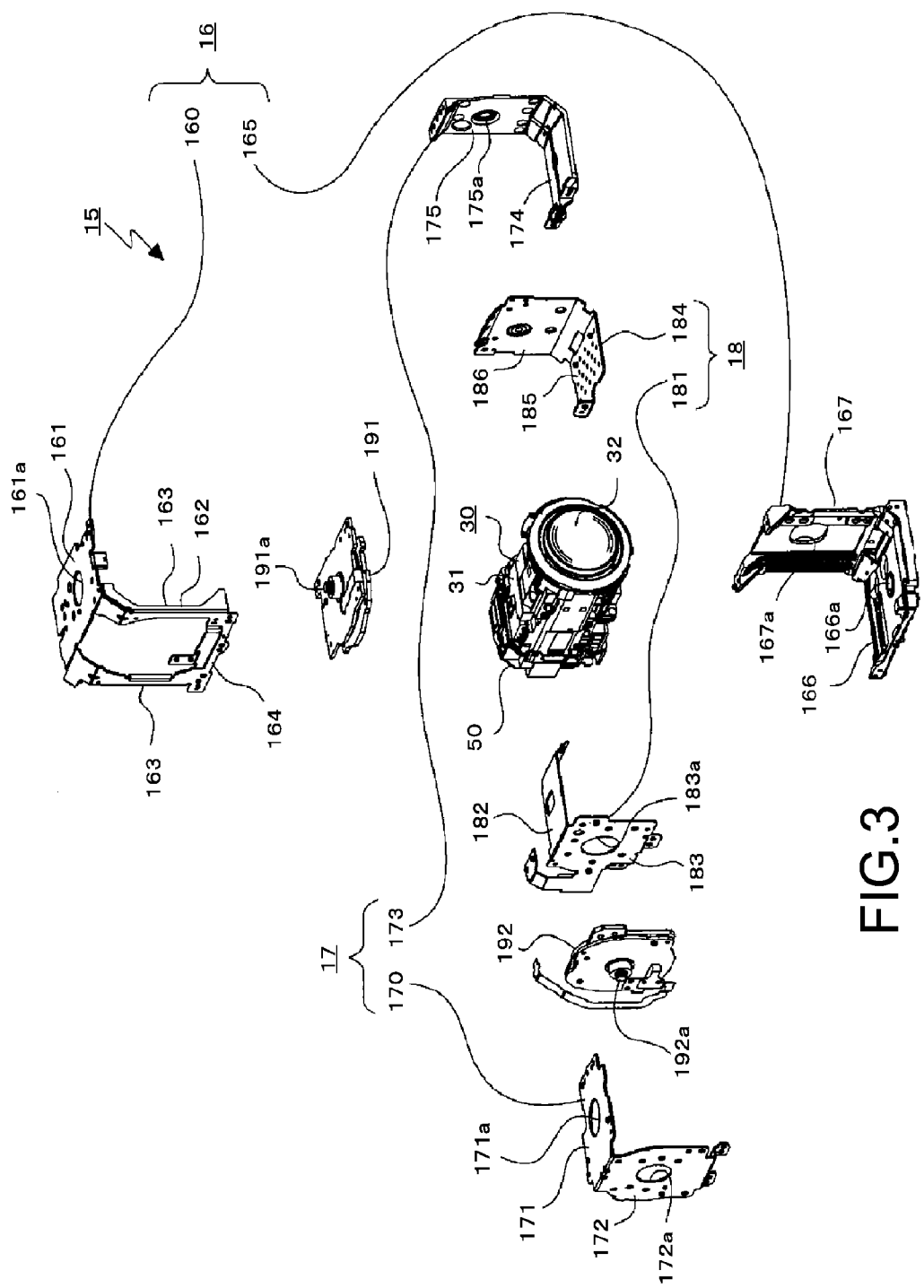
FIG. 3 is an exploded perspective diagram of the gimbal mechanism.
Figure 4:
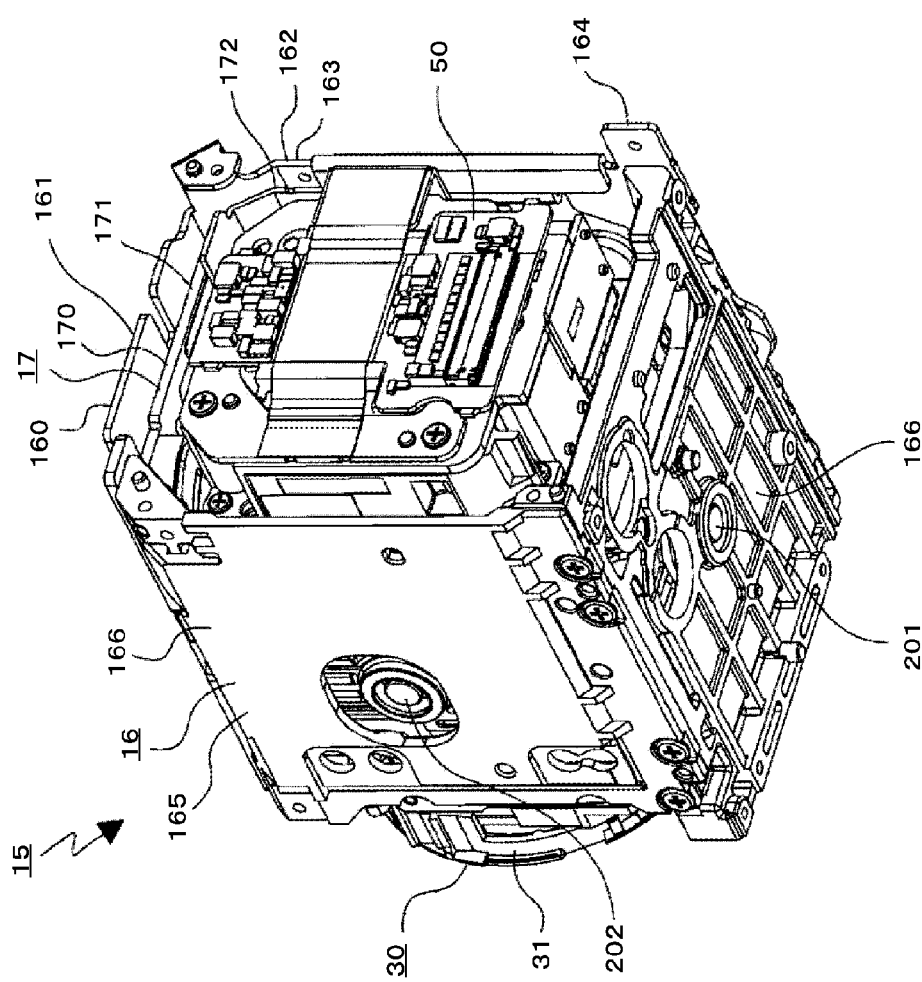
FIG. 4 a perspective diagram of the gimbal mechanism viewed from a direction different from that shown in FIG. 3.
Figure 5:
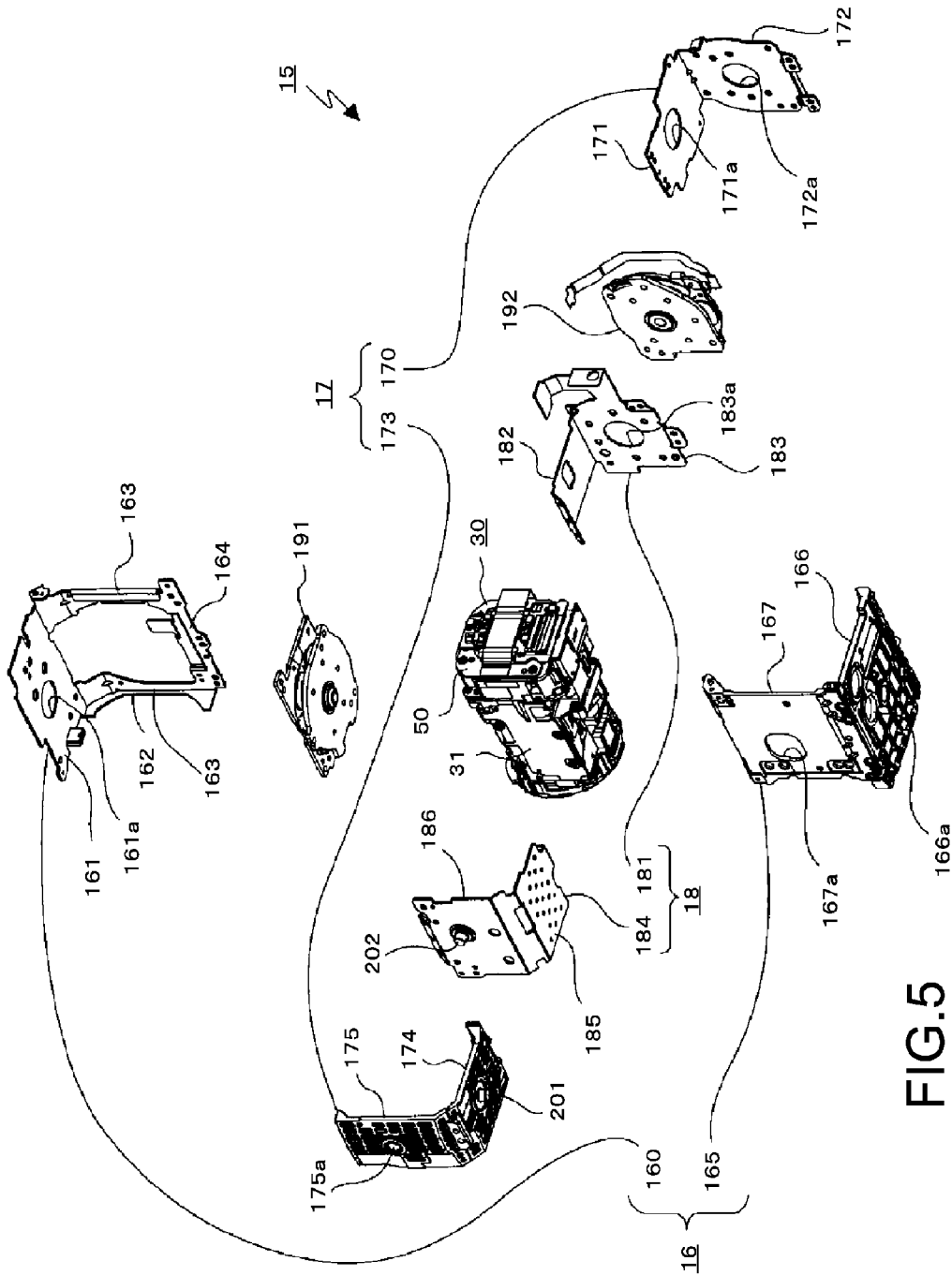
FIG. 5 is an exploded perspective diagram of the gimbal mechanism viewed from a direction different from that shown in FIG. 4.

FIG. 1 is a diagram illustrating an appearance of an image capturing apparatus. The image capturing apparatus according to an embodiment of the present technology is applicable to a mobile phone, a communication terminal apparatus, a car-mounted camera having an image capturing function as well as a video camera.

On an upper face of an image capturing apparatus 10, a microphone 101, a zoom lever 102, an image capturing button 103 and the like are disposed. At a rear face of the image capturing apparatus 10, a buttery 104 is mounted. An upper front face of the image capturing apparatus 10, a flash 105 is disposed. The flash 105 emits assist light forward. At a side face of the image capturing apparatus 10, a display panel unit 106 is turnably and rotatably connected. At a front face of the image capturing apparatus 10, a lens unit 30 is disposed. At a rear end face of the image capturing apparatus 10, a finder unit 107 is disposed.

<2. Configuration and Operation of Image Positioning Adjustment Apparatus>

Next, a positioning adjustment mechanism for performing positioning adjustment of an area image-captured by the image capturing unit of the image capturing apparatus 10 will be described. The positioning adjustment mechanism is for performing positioning adjustment of an intended subject at a fixed position of the captured image upon a subject tracking and an image vibration correction.

The positioning adjustment mechanism controls any of a position of the image capturing unit used in the lens unit, an adjusting lens and an image capturing unit, and a position of an image capturing area where an image is read out in the image capturing unit based on the vibration detection result or the subject detection result. By the control, the positioning adjustment mechanism performs positioning of the intended subject image-captured by the image capturing unit at the fixed position of the captured image.

The positioning adjustment mechanism adjusts at least either of an image capturing direction of the image capturing optical system or a relative position between a subject optical image and the image capturing area in the image capturing unit generating an image signal based on the subject optical image, thereby performing the positioning adjustment of the area image-captured by the image capturing unit.

Here, as the configuration of the positioning adjustment mechanism, adjustment of the image capturing direction of the image capturing optical system will be described. The positioning adjustment mechanism includes the lens unit, a vibration detection unit, a positioning unit and an adjusting control unit. The lens unit includes the image capturing optical system and the image capturing unit for generating an image signal of the captured image. The vibration detection unit detects vibration added to the lens unit. The positioning unit includes a gimbal mechanism. The gimbal mechanism adjusts an image capturing position by turning the lens unit in a first direction that is a shaft rotating direction of a first fulcrum axis orthogonal to an optical axis of the image capturing optical system and in a second direction that is a shaft rotating direction of a second fulcrum axis orthogonal to both of the optical axis of the image capturing optical system and the first fulcrum axis. The gimbal mechanism adjusts the image capturing position by turning the lens unit in a yawing direction and a pitching direction, for example.

FIGS. 2 to 5 are perspective diagrams and exploded perspective diagrams of the gimbal mechanism. A gimbal mechanism 15 includes an outer frame 16, an inner frame 17 and a holding frame 18.

The outer frame 16 is configured by connecting a first member 160 and a second member 165.

The first member 160 is configured by a right end of a first face 161 toward an up and down direction and by an upper end of a second face 162 toward a left and right direction sequentially formed. Into a center of the first face 161, a though-hole 161a is formed. The second face 162 includes a pair of columns 163 positioned back and forth extending substantially vertically and a connecter 164 connecting each lower end of the columns 163 extending back and forth.

The second member 165 is configured by a left end of a first face 166 toward an up and down direction and by a lower end of a second face 167 in a left and right direction sequentially formed. Into a center of the first face 166, an arranging hole 166a is formed. Into a center of the second face 167, a though-hole 167a is formed.

The lower end of the second face 162 in the first member 160 and the right end of the first face 166 in the second member 165 are connected, e.g., screwed.

The inner frame 17 is positioned inside of the outer frame 16 and configured by connecting a first support member 170 and a second support member 173.

The first support member 170 is configured by a right end of a top face 171 toward an up and down direction and by an upper end of a right face 172 in a left and right direction sequentially formed. Into a center of the top face 171, a though-hole 171a is formed. Into a center of the right face 172, a though-hole 172a is formed.

The second support member 173 is configured by a left end of a bottom face 174 toward an up and down direction and by a lower end of a left face 175 toward a left and right direction sequentially formed. Into a center of the bottom face 174, a hole for attaching a second axis 201 is formed. Into a center of the left face 175, an arranging hole for 175a is formed.

The lower end of the right face 172 in the first support member 170 and the right end of the bottom face 174 in the second member 173 are connected, e.g., screwed. The left end of the top face 171 in the first support member 170 and the top end of the left face 175 in the second member 173 are connected, e.g., screwed.

The holding frame 18 is positioned inside of the inner frame 17 and configured by connecting a first attachment member 181 and a second attachment member 184.

The first attachment member 181 is configured by a right end of a top face 182 toward an up and down direction and by an upper end of a right side face 183 toward a left and right direction sequentially formed. Into a center of the right side face 183, a though-hole 183a is formed.

The second attachment member 184 is configured by a left end of a bottom face 185 toward an up and down direction and by a lower end of a left face 186 toward a left and right direction sequentially formed. Into a center of the left side face 186, a hole for attaching a second axis 202 is formed.

The lower end of the right side face 183 in the first attachment member 181 and the right end of the bottom face 185 in the second attachment member 184 are connected, e.g., screwed. The left end of the top face 182 in the first attachment member 181 and the top end of the left face 186 in the second attachment member 184 are connected, e.g., screwed.

The lens unit 30 is disposed inside of the holding frame 18, and includes a lens tube 31, an image capturing optical system 32 arranged within the lens tube 31 back and forth including a plurality of lenses, and an image capturing unit 50 attached to a rear end of the lens tube 31. The lens tube 31 is formed as a long tube back and forth. The image capturing unit 50 includes an image capturing sensor (not shown) such as a CCD (Charge Coupled Device) and a CMOS (Complementary Metal-Oxide Semiconductor).

On an upper side of the lens unit 30, a first driving motor 191 is disposed. At a right side of the lens unit 30, a second driving motor 192 is disposed. The first driving motor 191 and the second driving motor 192 are flat motors, for example.

To the attachment hole of the bottom face 174 in the inner frame 17, the second axis 201 is attached. The upper end of the second axis 201 is attached to the attachment hole, and remaining portions other than the upper end are protruded from the bottom of the bottom face 174.

To the attachment hole of the left face 186 in the holding frame 18, the second axis 202 is attached. The right end of the second axis 202 is attached to the attachment hole, and remaining portions other than the right end are protruded from the bottom face 186 to the left side.

A bearing is inserted into the arranging hole 166a in the first face 166 of the outer frame 16. Also, a bearing is inserted into an arranging hole 175a in the left face 175 of the inner frame 17.

The holding frame 18 is attached, e.g., screwed to an outer periphery of the lens unit 30. With the holding frame 18 attached to the lens unit 30, both front and back ends of the lens unit 30 are protruded from front and back of the holding frame 18.

A second driving motor 192 is attached, e.g., screwed to an outer face of the right side face 183 in the holding frame 18, and is disposed at a right side of the holding frame 18.

An inner frame 17 is disposed at outer periphery of the holding frame 18. With the inner frame 17 disposed at the outer periphery of the holding frame 18, the second axis 202 attached to the left face 186 of the holding frame 18 is rotatably supported by the bearing inserted into the arranging hole 175a in the left face 175 of the inner frame 17.

The first driving motor 191 is attached, e.g., screwed to an upper face of the top face 171 in the inner frame 17 and is disposed at an upper side of the inner frame 17.

With the outer frame 16 disposed at the outer periphery of the inner frame 17, the second axis 201 attached to the bottom face 174 of the inner frame 17 is rotatably supported by the bearing inserted into the arranging hole 166a of the first face 166 of the outer frame 16.

In the gimbal mechanism 15 configured as described above, an axis connecting a center axis of an output axis 191a of the first driving motor 191 and a center axis of the second axis 201 is defined as a first fulcrum axis. Also, an axis connecting a center axis of an output axis 192a of the second driving motor 192 and a center axis of the second axis 202 is defined as a second fulcrum axis. In other words, in the gimbal mechanism 15, when the first driving motor 191 is driven, the lens unit 30 is driven in a yawing direction, and when the second driving motor 192 is driven, the lens unit 30 is driven in a pitching direction.

In this way, by the positioning adjustment mechanism using the gimbal mechanism 15, the lens unit 30 is driven in the yawing direction or the pitching direction and performs the positioning adjustment of the image capturing area.

Figure 6:
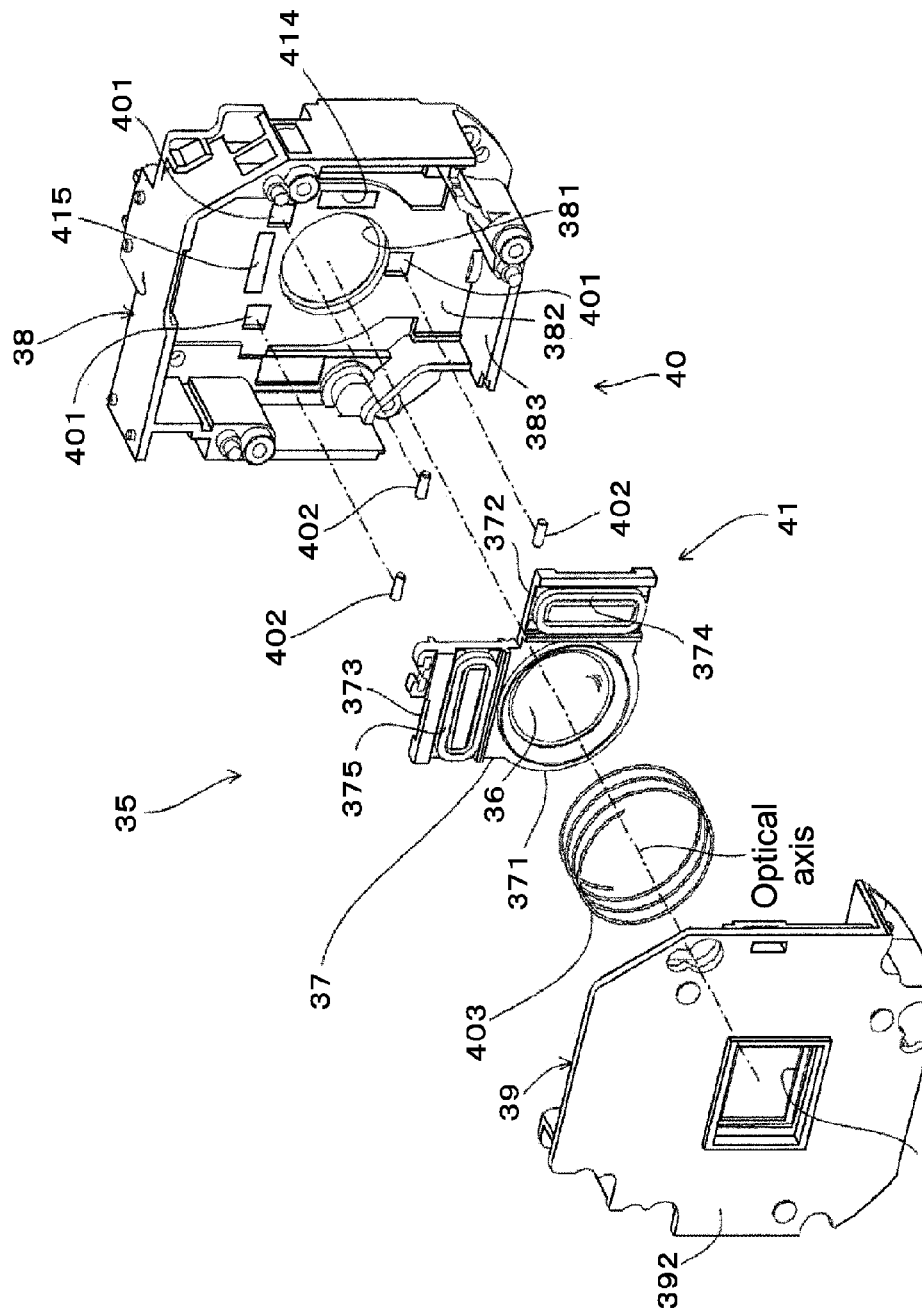
FIG. 6 is an exploded diagram of a lens shift mechanism.

Next, as another configuration of the positioning adjustment mechanism, adjustment of the relative position between the subject optical image and the image capturing area in the image capturing unit will be described. FIG. 6 is an exploded diagram of the lens shift mechanism configured to control the position of the adjusting lens and to adjust the image capturing position. The lens shift mechanism 35 includes an adjusting lens 36, an adjusting lens holding frame 37, a base 38, a cover 39, an adjusting lens support mechanism 40 and an adjusting lens moving mechanism 41.

The adjusting lens 36 is driven in an X axis direction and a Y axis direction that are two directions orthogonal to each other on a planar surface orthogonal to the optical axis of the lens unit, and performs the positioning adjustment of the subject image captured on an image capturing face of the image capturing sensor disposed on the above described image capturing unit 50.

The adjusting lens holding frame 37 includes a frame body 371, a first protrusion 372 protruded from a side of the frame body 371 and a second protrusion 373. According to the embodiment, the adjusting lens holding frame 37 is integrally molded with a synthetic resin material.

The adjusting lens 36 is supported by the frame body 371. The first protrusion 372 is protruded and molded from one side of the body 371 outside in a radial direction along the X axis direction. The second protrusion 373 is protruded and molded from a side of the position rotated at 90 degrees at the center of the optical axis to the one side face of the body 371 to the direction orthogonal to the first protrusion 372 along the Y axis direction.

On the first protrusion 372 and the second protrusion 373, a first coil 374 and a second coil 375 are attached to the face opposing to the cover 39, respectively.

The base 38 includes a back wall 382 having an opening 381 for forming an optical path that the optical axis is centered and a side wall 383 standing up forward from a peripheral of the back wall 382. According to the embodiment, the base 38 is integrally molded with a synthetic resin material.

A first magnet 414 and a second magnet 415 are attached to the back wall 382 facing to the first coil 374 and the second coil 375, respectively.

According to the embodiment, the adjusting lens moving mechanism 41 is configured of the coils 374 and 375 and the magnets 414 and 415.

The cover 39 includes a front wall 392 having an opening 391 for forming an optical path that the optical axis is centered.

By assembling the base 38 and the cover 39, a space for housing an adjusting lens holding frame 37, an adjusting lens support mechanism 40 and the adjusting lens moving mechanism 41 is formed inside. The base 38 and the cover 39 are assembled by a variety of known methods in the related art such as a screw connection and adhesion by an adhesive agent.

The adjusting lens support mechanism 40 includes three supports 401, three rolling matters 402 each of which is separated by the three supports 401 and a keeper 403. The three supports 401 are formed apart each other between the adjusting lens holding frame 37 and the base 38, and support and can drive the adjusting lens holding frame 37 on the planar surface orthogonal to the optical axis in the direction orthogonal thereto.

The keeper 403 keeps a constant distance between the adjusting lens holding frame 37 and the base 38 along the optical axis. The keeper 403 includes a coil spring interposed between the adjusting lens holding frame 37 and the cover 39, and three cylindrical rolling matters 402.

According to the embodiment, the coil spring is single strand, is formed to have an inner diameter greater than the adjusting lens 36, and is disposed such that the optical path for the captured image is positioned inside of the coil spring.

The keeper 403 constantly energizes the adjusting lens holding frame 37 to a direction of the base 38. The energizing force allows the distance between the adjusting lens holding frame 37 and the base 38 along the optical axis to be constant.

According to the embodiment, the three rolling matters 402 can be supported by the respective supports 401 owing to the keeper 403 without shaking.

Note that any keeper 403 may be used as long as the constant distance between the adjusting lens holding frame 37 and the base 38 along the optical axis is kept, and is not limited to the above-described configuration. A variety of structures known in the art can be applied to the keeper 403. The above-described configuration is advantageous in that the number of parts can be decreased.

In the lens shift mechanism 35, the coils 374 and 375 and the magnets 414 and 415 moves the adjusting lens 36 in the direction orthogonal to the optical axis on the planar surface.

In this way, the positioning adjustment mechanism using the lens shift mechanism 35 drives the adjusting lens 36 disposed in the lens unit 30, for example, in the direction orthogonal to the optical axis of the image capturing optical system and performs the positioning adjustment of the image capturing area.

As described above, when the gimbal mechanism is used as the positioning adjustment mechanism, as the lens unit is moved, a positioning adjustment amount (a positioning range) can be increased as compared to the lens shift mechanism. Also, when the gimbal mechanism is used as the positioning adjustment mechanism, as the adjusting lens is moved to perform the positioning adjustment, the positioning adjustment is possible with the driving force lower as compared to the gimbal mechanism. Furthermore, the positioning adjustment mechanism may be configured by using the gimbal mechanism and the lens shift mechanism. In this case, the positioning adjustment mechanism can perform the positioning adjustment effectively by moving the lens unit when the adjustment amount is great, or by moving the adjusting lens when the adjustment amount is small.

Note that the positioning adjustment mechanism is not limited to use only the gimbal mechanism, only the lens shift mechanism, or the gimbal mechanism and the lens shift mechanism. The positioning adjustment mechanism may perform the positioning adjustment using a sensor shift mechanism for moving the image capturing sensor to the direction orthogonal to the optical axis of the image capturing optical system instead of moving the adjusting lens, for example. Also, the positioning adjustment mechanism may use the gimbal mechanism and the sensor shift mechanism. Furthermore, the positioning adjustment mechanism may control the position where the image is read out in the image capturing unit, electronically move the image capturing area and adjust the relative position between the subject optical image and the image capturing area; or may move the lens unit and so on in addition to control the position where the image is read out.

<3. Configuration of Image Capturing Apparatus>

Figure 7:
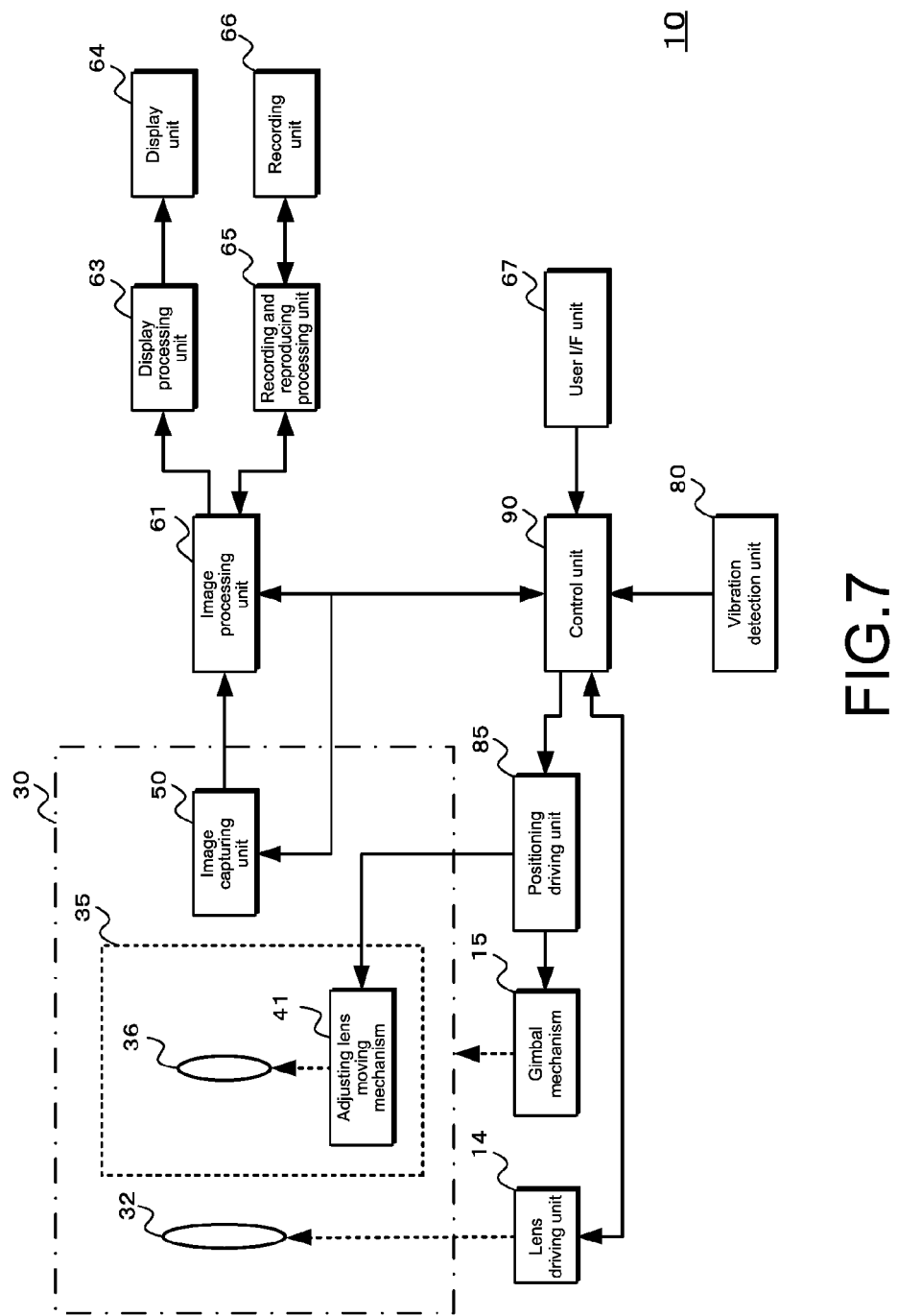
FIG. 7 is a diagram showing a configuration of an image capturing apparatus.

FIG. 7 is a diagram showing a configuration of the image capturing apparatus. The positioning adjustment mechanism used in the image capturing apparatus includes the gimbal mechanism and the lens shift mechanism.

The image capturing apparatus 10 includes the lens unit 30, the image processing unit 61, a display processing unit 63, a display unit 64, a recording and reproducing processing unit 65, a recording unit 66, a user interface (a user I/F) unit 67, a vibration detection unit 80, a positioning adjustment driving unit 85 and the control unit 90. Also, the image capturing apparatus 10 includes a lens driving unit 14 and the gimbal mechanism 15. In addition, the lens unit 30 includes the image capturing optical system 32, the lens shift mechanism 35 and the image capturing unit 50.

The image capturing optical system 32 is configured of a focus lens, a zoom lens and the like. For example, the image capturing optical system 32 moves the zoom lens to the optical axis direction and varies a focal length; or moves the focus lens to the optical axis direction and adjusts a focus.

The lens shift mechanism 35 moves the adjusting lens 36 to the direction orthogonal to the optical axis as described above by the adjusting lens moving mechanism 41 based on a second driving signal from the positioning adjustment driving unit 85 as described later to perform the subject tracking and the image vibration correction.

The image capturing unit 50 is configured of the image capturing sensor, a preprocessing unit, an image capturing driving unit and the like. The image capturing sensor performs photoelectric conversion processing, and converts an optical image captured on the image capturing face by the image capturing optical system 32 and the adjusting lens 36. As the image capturing sensor, a Charge Coupled Device (CCD) image sensor, a Complementary Metal-Oxide Semiconductor (CMOS) image sensor or the like is used. The preprocessing unit removes noises in an electrical signal generated by the image capturing sensor using Correlated Double Sampling (CDS). Also, the preprocessing unit adjusts gain such that a signal level of the electric signal is set to a desirable signal level.

Furthermore, the preprocessing unit performs an A/D conversion processing, coverts an analog image signal that is the electric signal to which the noise is removed and a gain is adjusted into a digital image signal, and outputs the digital image signal to the image processing unit 61. An image capturing driving unit generates an operation pulse to drive the image capturing sensor based on a control signal from the control unit 90 as described later. For example, a pulse for reading out a charge, a pulse for transferring in a vertical direction or in a horizontal direction, a pulse for performing an electron shutter operation or the like is generated.

The lens driving unit 14 drives the focus lens and the zoom lens based on the control signal from the control unit 90. The lens driving unit 14 outputs information about a lens position to the control unit 90.

The gimbal mechanism 15 turns the lens unit 30 to the yawing direction and the pitching direction as described above based on a first driving signal from the positioning adjustment driving unit 85 as described later, thereby performing the subject tracking and the image vibration correction.

The image processing unit 61 performs camera processing to the image signal outputted from the image capturing unit 50. For example, the image processing unit 61 performs non-linear processing such as gamma correction and knee correction, color correction processing, or contour emphasis processing to the image signal. The image processing unit 61 outputs the image signal processed to the display processing unit 63 or the recording and reproducing processing unit 65. The image processing unit 61 recognizes the subject using the image signal and detects the position of the target subject in the captured image.

For example, the image processing unit 61 recognizes a face and detects an intended person as the target subject. The image processing unit 61 recognizes the subject and detects a background subject included in the captured image, e.g., a horizon showing a border between a background building and sky. The image processing unit 61 generates coordinate information showing the position of the target subject detected and the background subject in the captured image. The image processing unit 61 determines the size of the target subject in the captured image. The image processing unit 61 outputs the recognized result of the target subject or the background subject, the coordinate information about the target subject detected and the background subject, and the size of the target subject determined to the control unit 90 as a subject recognition result.

The display processing unit 63 processes the image signal outputted from the image processing unit 61 to an image signal corresponding to a display device of the display unit 64. The display processing unit 63 converts resolution of the image signal outputted from the image processing unit 61, generates the image signal having the resolution corresponding to the display device of the display unit 64 and outputs the image signal to the display unit 64.

The display unit 64 is composed of the display panel unit 106 and the finder unit 107 as described above. The display unit 64 displays a camera through image based on the image signal outputted from the display processing unit 63. The display unit 64 displays a menu for setting an operation of the image capturing apparatus 10, an operation status and discrimination threshold information as described later.

The recording and reproducing processing unit 65 outputs the image signal outputted from the image processing unit 61 as a recording signal having a predetermined file format to the recording unit 66. The recording and reproducing processing unit 65 may perform coding processing of the image signal and decoding processing of the encoding signal. The recording and reproducing processing unit 65 processes the signal read out by the recording unit 66, outputs an image signal of a resultant reproduced image to the display processing unit 63 and displays the reproduced image on the display unit 64.

The recording unit 66 records a recorded signal outputted from the recording and reproducing processing unit 65 to a recording medium. The recording medium may be detachable, e.g., a memory card, an optical disk, a magnetic tape or the like or may be fixed, e.g., a Hard Disk Drive (HDD), a semiconductor module or the like. The recording unit 66 reads out the signal recorded in the recording medium and outputs the signal to the recording and reproducing processing unit 65.

The user interface unit 67 is composed of the zoom lever 102, the image capturing button 103 and the like, as shown in FIG. 1. The user interface unit 67 generates an operation signal corresponding to a user operation and outputs the operation signal to the control unit 90.

The vibration detection unit 80 detects vibration added to the image capturing apparatus 10 (the lens unit 30). The vibration detection unit 80 is composed of a gyro sensor, a three-dimensional accelerator sensor and the like and outputs a vibration detection result to the control unit 90.

The positioning adjustment driving unit 85 generates the first driving signal and the second driving signal based on the control signal from the control unit 90. The positioning adjustment driving unit 85 outputs the first driving signal to the gimbal mechanism 15 and outputs the second driving signal to the adjusting lens moving mechanism 41 in the lens shift mechanism 35.

The control unit 90 includes a Central Processing Unit (CPU), a Read Only Memory (ROM) and a Random Access Memory (RAM), for example. The CPU reads out and executes a control program stored in the ROM, as appropriate. The ROM stores programs executed in the CPU and data necessary for various processes in advance. The RAM is a memory used as a so-called working area where processing in progress is temporarily stored. The ROM or the RAM stores information about a variety of setting parameters. The control unit 90 controls the respective units depending on the operation signal from the user interface unit 67, and allow the operation in response to the user operation to be performed in the image capturing apparatus 10.

The control unit 90 determines a priority order of subject tracking processing for driving the gimbal mechanism 15 which is the positioning adjustment mechanism and the lens shift mechanism 35 based on the subject recognition result provided from the image processing unit 61 and image vibration correction processing for driving the above-described positioning adjustment mechanism based on a vibration detection result of the vibration detection unit 80, and limits the adjustment amount of the positioning adjustment mechanism for the processing having no priority. The control unit 90 outputs the control signal for driving the positioning adjustment mechanism to the positioning adjustment driving unit 85 based on a combined result of a subject tracking amount and the image vibration correction amount after the limiting processing or a combined result of the image vibration correction amount and the subject tracking amount after the limiting process.

The adjusting control unit may be disposed at the lens unit together with the vibration detection unit in the control unit 90. In this case, when the lens unit is configured to be exchangeable, a good quality captured image can be provided by performing the subject tracking and the image vibration correction as long as the lens unit is mounted to a main body of the image capturing apparatus capable of recognizing the subject.

<4. Operation of Image Capturing Apparatus>

Figure 8:
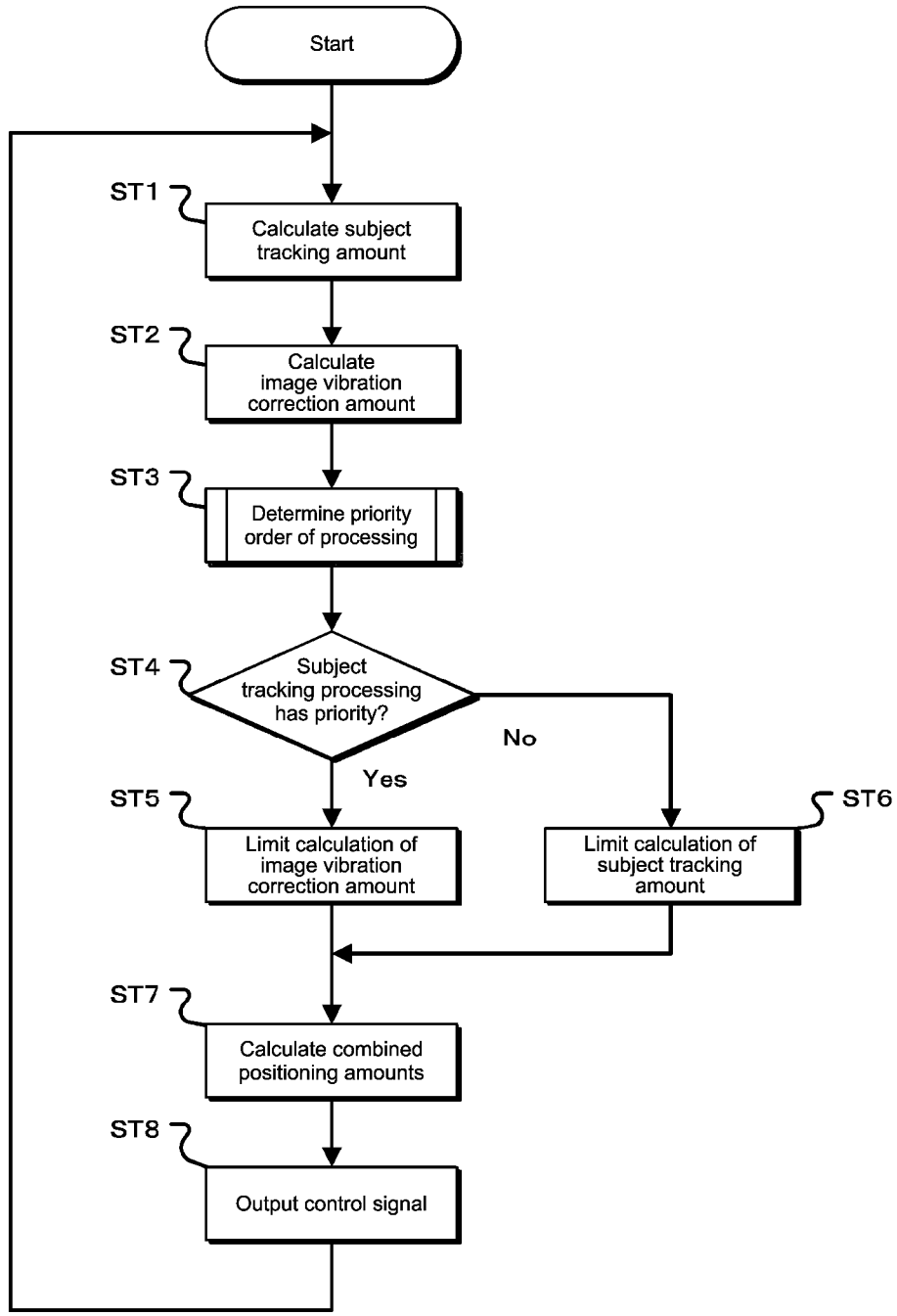
FIG. 8 is a flow chart showing a subject tracking operation.

Next, an operation of the image capturing apparatus will be described. FIG. 8 is a flow chart showing the subject tracking operation in the image capturing apparatus. For simplifying the description, a maximum positioning adjustment amount Vmax of the positioning adjustment mechanism is defined when both of the gimbal mechanism 15 and the lens shift mechanism 35 are used.

$$V\text{max} = (V\text{max}\_y, V\text{max}\_p) \quad (1)$$

In Expression (1), "Vmax_y" represents a maximum positioning adjustment amount in the yawing direction and "Vmax_p" represents a maximum positioning adjustment amount in the pitching direction.

The image capturing apparatus performs the subject tracking operation shown in FIG. 8 when the user instructs to track the intended subject (hereinafter referred to as a "target subject"). Under a mode of capturing a moving picture, the image capturing apparatus starts the tracking operation as tracking the target subject is instructed to be tracked upon a start-up or a picture recording start, for example. Upon a mode of capturing a still image, the image capturing apparatus starts the tracking operation as tracking the target subject is instructed to be tracked when a shutter button is pressed halfway, for example. The tracking operation may be started not only at the above-described timing, but also at other timing.

In a step ST1 in FIG. 8, the control unit 90 calculates the subject tracking amount. The control unit 90 calculates the positioning adjustment amount to adjust the image capturing position such that the target subject is stopped within the captured image based on the subject recognition result. The control unit 90 estimates a moving amount of the target subject in the yawing direction and the pitching direction from a change amount between the frames of the coordinate information showing the position of the target subject and a current zoom position in the image capturing optical system 32, for example.

The control unit 90 defines the positioning adjustment amount in the yawing direction necessary for placing the target subject at a stop position as a subject tracking amount "Vtrack_y" and defines the positioning adjustment amount in the pitching direction as a subject tracking amount "Vtrack_p" based on an estimation result of a moving amount. The control unit 90 proceeds to a step ST2 by recognizing the subject tracking amount "Vtrack_y" and "Vtrack_p" as the subject tracking amount Vtrack, as shown in Expression (2):

$$V\text{track} = (V\text{track}\_y, V\text{track}\_p) \quad (2)$$

In the step ST2, the control unit 90 calculates the image vibration correction amount. The control unit 90 calculates the positioning adjustment amount to adjust the image capturing position such that the captured image not vibrated is provided based on the vibration detection result. The control unit 90 estimates the vibration amount of the target subject in the yawing direction and the pitching direction based on the vibration detection result.

The control unit 90 defines the positioning adjustment amount in the yawing direction necessary for not vibrating the target subject as an image vibration correction amount "Vsteady_y" and defines the positioning adjustment amount in the pitching direction as an image vibration correction amount "Vsteady_p" based on an estimation result of the vibration amount. The control unit 90 recognizes the image vibration correction amount "Vsteady_y" and "Vsteady_p" as the image vibration correction amount Vsteady as shown in Expression (3):

$$Vsteady = (Vsteady\_y, Vsteady\_p) \quad (3)$$

The control unit 90 calculates and holds the image vibration correction PP value (peak to peak value) dVs showing a PP value of the image vibration correction amount Vsteady in a predetermined period (for example, a certain period just before). In Expression (4), "dVs_y" represents the image vibration correction PP value in the yawing direction and "dVs_p" represents the image vibration correction PP value in the pitching direction.

$$dVs = (dVs\_y, dVs\_p) \quad (4)$$

The control unit 90 calculates the image vibration correction amount Vsteady and the image vibration correction PP value dVs and proceeds to a step ST3.

In the step ST3, the control unit 90 determines the priority processing. The control unit 90 determines a priority order of the subject tracking processing and the image vibration correction processing. The control unit 90 gives a priority to processing with a less movement within the captured image, thereby providing a good quality captured image.

Figure 9:
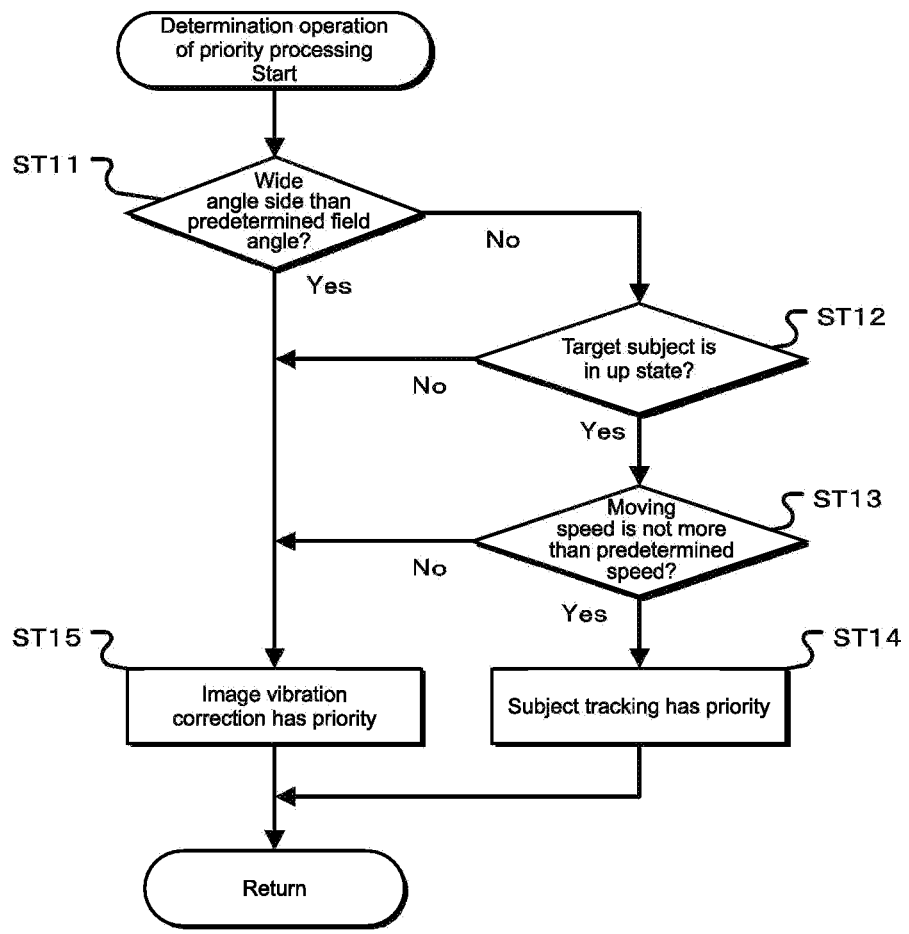
FIG. 9 is a flow chart illustrating an operation of priority processing determination.

FIG. 9 is a flow chart illustrating an operation of the priority processing determination. In a step ST11, the control unit 90 determines that the zoom position of image capturing optical system is on a wider angle side than a predetermined field angle. When the current zoom position is not on the wider angle side than the predetermined field angle, the control unit 90 proceeds to a step ST12 based on zoom lens position information provided from the lens driving unit 14.

When the current zoom position is on the wider angle side than the predetermined field angle, the control unit 90 proceeds to a step ST15. The control unit 90 defines the zoom position (the focal length) having the predetermined field angle as a threshold value Zwide_thr. When a current zoom position (a focal length) Zp satisfies Expression (5), it is determined that the zoom position is on the wider angle side than the predetermined field angle.

$$Zp < Zwide\_thr \quad (5)$$

In a step ST12, the control unit 90 determines whether or not the target subject is in an up state. The control unit 90 determines whether or not the target subject is in the up state based on the size of the target subject shown by the subject recognition result. For example, the size of the target subject represents pixel counts Ts in the image area of the target subject in the captured image.

In this case, when the pixel counts Ts are greater than a threshold value Ts_thr that is the pixel counts of the image area having a predetermined size shown by Expression (6), the control unit 90 determines the target subject to be in the up state and proceeds to a step ST13. When the pixel counts Ts is not more than the threshold value Ts_thr, the control unit 90 determines the target subject not to be in the up state and proceeds to a step ST15.

$$Ts > Ts\_thr \quad (6)$$

In the step ST13, the control unit 90 determines that a moving speed of the target subject is not more than a predetermined speed. The control unit 90 calculates the moving speed of the target subject based on the subject recognition result and the vibration detection result. For example, the control unit 90 determines the position to which the target subject moves between the frames based on positional information of the target subject and calculates the moving amount within the captured image based on a determination result. The moving amount within the captured image may be calculated by the image processing unit 61.

When the subject tracking using the positioning adjustment mechanism effectively functions, the target subject is stationary positioned within the captured image. The moving speed of the target subject equals to that of a tracking component when the subject tracking is performed by the positioning adjustment mechanism. When the target subject is moved within the captured image, the moving speed of the target subject is lower or higher than that of the tracking component.

Accordingly, the control unit 90 calculates a subject speed Tv_real based on the moving speed of the tracking component and within the captured image. For example, when the position of the target subject is moved to a tracking direction within the captured image in a direction opposite to the tracking direction, the speed of the target subject is lower than the moving speed based on the tracking component. Accordingly, the speed based on the tracking component is subtracted from the speed based on the moving amount within the captured image to provide a subject speed Tv_real. When the position of the target subject is moved to the tracking direction, the speed of the target subject is higher than the moving speed based on the tracking component.

Accordingly, the speed based on the tracking component is added to the speed based on the moving amount within the captured image to provide the subject speed Tv_real. When the control unit 90 determines that the subject speed Tv_real calculated is not more than the threshold value Tv_thr being the predetermined speed as shown in Expression (7), the control unit 90 proceeds to a step ST14.

When the control unit 90 determines that the subject speed Tv_real calculated is higher than the threshold value Tv_thr, the control unit 90 proceeds to a step ST15.

$$Tv\_real \leq Tv\_thr \quad (7)$$

The control unit 90 determines that the subject tracking has priority in a step ST14. The control unit 90 determines that the subject tracking processing has priority and proceeds to a step ST4 shown in FIG. 8.

When the steps ST11 through ST13 proceed to the steps ST15, the control unit 90 determines that the image vibration correction has priority. The control unit 90 determines that the image vibration correction proceeding has priority and proceeds to a step ST4 shown in FIG. 8.

A processing sequence from the steps ST11 through ST13 is not limited to that shown in FIG. 9 and may be changed to other sequences. The processing from the steps ST11 through ST13 may be selectively performed. For example, the processing in the step ST13 may be omitted.

In a step ST4 in FIG. 8, the control unit 90 determines that the subject tracking processing has priority. When the subject tracking has priority by the priority processing determination in the step ST3, the control unit 90 proceeds to a step ST5. When the image vibration correction has priority, the control unit 90 proceeds to a step ST6.

In the step ST5, the control unit 90 performs a limit calculation of the image vibration correction amount. The control unit 90 gives the priority to the subject tracking processing and limits the adjustment amount of the positioning adjustment mechanism to the image vibration correction processing having no priority. For example, the control unit 90 assigns all possible adjustment amounts of the positioning adjustment mechanism in the subject tracking direction to the subject tracking processing, and sets the positioning adjustment amount of the positioning adjustment mechanism to the image vibration correction processing in the subject tracking direction to "0".

When the subject tracking direction is the yawing direction, the control unit 90 sets the image vibration correction amount to "Vsteady_y=0" such that the image vibration correction in the subject tracking direction is not performed. When the subject tracking direction includes a component in the pitching direction, the control unit 90 sets the image vibration correction amount in the pitching direction to "Vsteady_p=0" such that the image vibration correction in the subject tracking direction is not performed.

Although the possible adjustment amount of the positioning adjustment mechanism to the image vibration correction processing is set to "0" by limiting the adjustment amount to "100%", it is not limited thereto. The positioning adjustment amount may be limited to a certain percentage. For example, the positioning adjustment amount may be limited to the percentage such that the possible adjustment amount of the positioning adjustment mechanism to the image vibration correction processing is lower than the possible adjustment amount of the positioning adjustment mechanism to the subject tracking direction. The percentage may be set in advance, or may be set by the user.

In this way, the control unit 90 limits the adjustment amount of the positioning adjustment mechanism to the image vibration correction processing having no priority and proceeds to a step ST7.

In the step ST6, the control unit 90 performs a limit calculation of the subject tracking amount. The control unit 90 gives the priority to the subject tracking processing and limits the adjustment amount of the positioning adjustment mechanism to the subject tracking processing having no priority. For example, when the processing in the above-described step ST2 is performed at the control unit 90, the image vibration correction PP value (peak to peak value) dVs showing the PP value of the image vibration correction amount Vsteady in a predetermined period (for example, a certain period just before) is held.

Accordingly, the control unit 90 takes the image vibration correction PP value dVs as an image vibration correction corresponding amount, assigns the possible adjustment amount of the positioning adjustment mechanism so that the positioning adjustment of the image vibration correction corresponding amount is performed and the rest of the possible adjustment amount is used for the subject tracking processing. When the subject tracking direction is the yawing direction and the subject tracking amount Vtrack_y in the yawing direction satisfies Expression (8), the control unit 90 limits subject tracking amount Vtrack_y as shown in Expression (9).

When the subject tracking direction is the pitching direction, the control unit 90 limits the subject tracking amount Vtrack_p in the pitching direction as shown in the following Expressions (10) and (11). Here, "dVs_y" represents the image vibration correction PP value dVs in the yawing direction, and "dVs_p" represents the image vibration correction PP value dVs in the pitching direction.

$$V\text{track}\_y > (V\max\_y - dVs\_y) \tag{8}$$

$$V\text{track}\_y = (V\max\_y - dVs\_y) \tag{9}$$

$$V\text{track}\_p > (V\max\_p - dVs\_p) \tag{10}$$

$$V\text{track}\_p = (V\max\_p - dVs\_p) \tag{11}$$

In this way, the control unit 90 limits the adjustment amount of the positioning adjustment mechanism to the image vibration correction processing having no priority and proceeds to the step ST7.

In the step ST7, the control unit 90 calculates combined adjustment amounts. The control unit 90 calculates the combined adjustment amounts Vm from the subject tracking amount and the image vibration correction amount limited in the step ST5 when the image vibration correction has the priority, and from the image vibration correction amount and the subject tracking amount limited in the step ST6 when the image vibration correction has the priority based on Expressions (12) to (14).

In this way, the control unit 90 calculates the combined adjustment amounts Vm and proceeds to a step ST8.

$$Vm = (Vm\_y, Vm\_p) \tag{12}$$

$$Vm\_y = (V\text{steady}\_y + V\text{track}\_y) \tag{13}$$

$$Vm\_p = (V\text{steady}\_p + V\text{track}\_p) \tag{14}$$

In the step ST8, the control unit 90 outputs a control signal for driving the positioning adjustment mechanism. The control unit 90 generates the control signal such that the positioning adjustment of the combined adjustment amounts Vm calculated in the step ST7 is performed in the positioning adjustment mechanism, outputs the amounts and returns to the step ST1. In this way, the control signal is outputted from the control unit 90 to the positioning adjustment driving unit 85 which drives the gimbal mechanism 15 and the lens shift mechanism 35, thereby providing a good quality captured image.

Figure 10A:
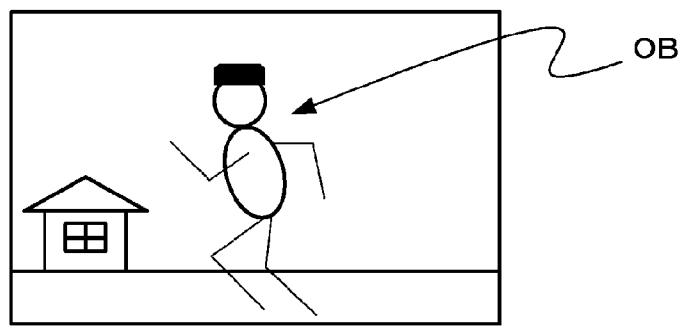
FIGS. 10A and 10B each shows a relationship between an image capturing status and priority processing.
Figure 10B:
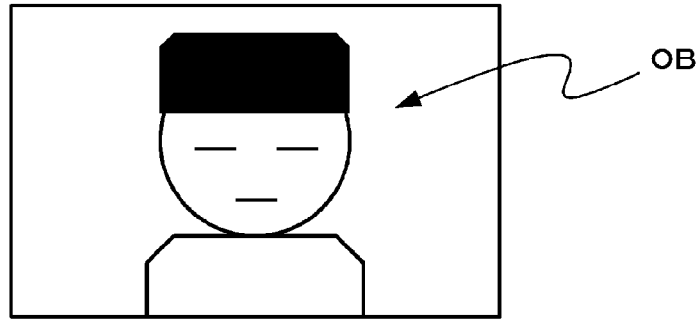

FIGS. 10A and 10B each shows a relationship between an image capturing status and priority processing. As shown in FIG. 10A, in the image capturing status where the zoom position of the image capturing optical system is on the wider angle side than a predetermined field angle and the target subject OB is captured in a small size, a background to be displayed as a still image is increased within the captured image. In this case, as the zoom position is on the wider angle side than the predetermined field angle, the image vibration correction processing has priority in the image capturing apparatus. Accordingly, a moving amount of the background within the captured image is decreased, which results in good quality captured image.

In addition, when the image vibration correction processing has priority, the image vibration correction corresponding amount can be positioned. Accordingly, when the target subject OB is continued to be tracked, the possible adjustment amount is exhausted due to the subject tracking and the image vibration correction becomes suddenly ineffective. It is thus possible to prevent such phenomenon.

As shown in FIG. 10B, in the image capturing status where the target subject OB is captured close up, the target subject to be displayed still is increased within the captured image. In this case, when the moving speed of the target subject is not more than a predetermined speed, subject tracking processing has priority in the image capturing apparatus. Accordingly, a moving amount of the target subject within the captured image is decreased, which results in good quality captured image. Also, by increasing the limit of the adjustment amount of the positioning adjustment mechanism to the image vibration correction processing, a possible range for performing the subject tracking can be widened.

In addition, when the moving speed of the target subject is fast, the possible adjustment amount of the positioning adjustment mechanism may be exhausted in a short time. Also, it would be desirable that the user is entrusted to perform the subject tracking. In such a scene, as the image vibration correction processing has priority, the positioning adjustment mechanism can be effectively utilized.

In this way, according to the present technology, when the subject tracking and the image vibration correction are performed by the same positioning adjustment mechanism, the limited possible adjustment amount of the positioning adjustment mechanism can be adequately divided into the subject tracking and the image vibration correction depending on the scenes captured. When the scene of a sports day or succor where the subject is moved actively is captured, the possible adjustment amount of the positioning adjustment mechanism is exhausted due to the subject tracking and the image vibration correction becomes suddenly ineffective, which results in a poor quality captured image. It is thus possible to avoid such phenomenon.

When the image vibration is small within a certain period, a larger part of the possible adjustment amount of the positioning adjustment mechanism can be provided to the subject tracking. It is thus possible to perform a good quality subject tracking when an image is captured using a tripod stand.

Although the above-described image capturing apparatus includes the gimbal mechanism and the lens shift mechanism as the positioning adjustment mechanism, the image capturing apparatus may include only the gimbal mechanism, only the lens shift mechanism or only the sensor shift mechanism as the positioning adjustment mechanism, as described above.

In the image capturing apparatus including both the gimbal mechanism and the lens shift mechanism (or the sensor shift mechanism) as the positioning adjustment mechanism, the operation to be have priority may be performed by the gimbal mechanism and an operation to be limited may be performed by the lens shift mechanism (or the sensor shift mechanism) according to a result of the operation of the priority processing determination, utilizing a feature that the positioning adjustment amount (the positioning adjustment range) can be increased by the gimbal mechanism as compared to the lens shift mechanism (or the sensor shift mechanism).

For example, by the operation of the priority processing determination, when the subject tracking operation is determined to be have priority, the subject tracking can be performed using the gimbal mechanism and a vibration correction operation to be limited can be performed using the lens shift mechanism (or the sensor shift mechanism). In contrast, when vibration correction operation is determined to be have priority, the vibration correction can be performed using the gimbal mechanism and the subject tracking operation to be limited can be performed using the lens shift mechanism (or the sensor shift mechanism).

<4-1. Other Operation of Priority Processing Determination>

Figure 11:
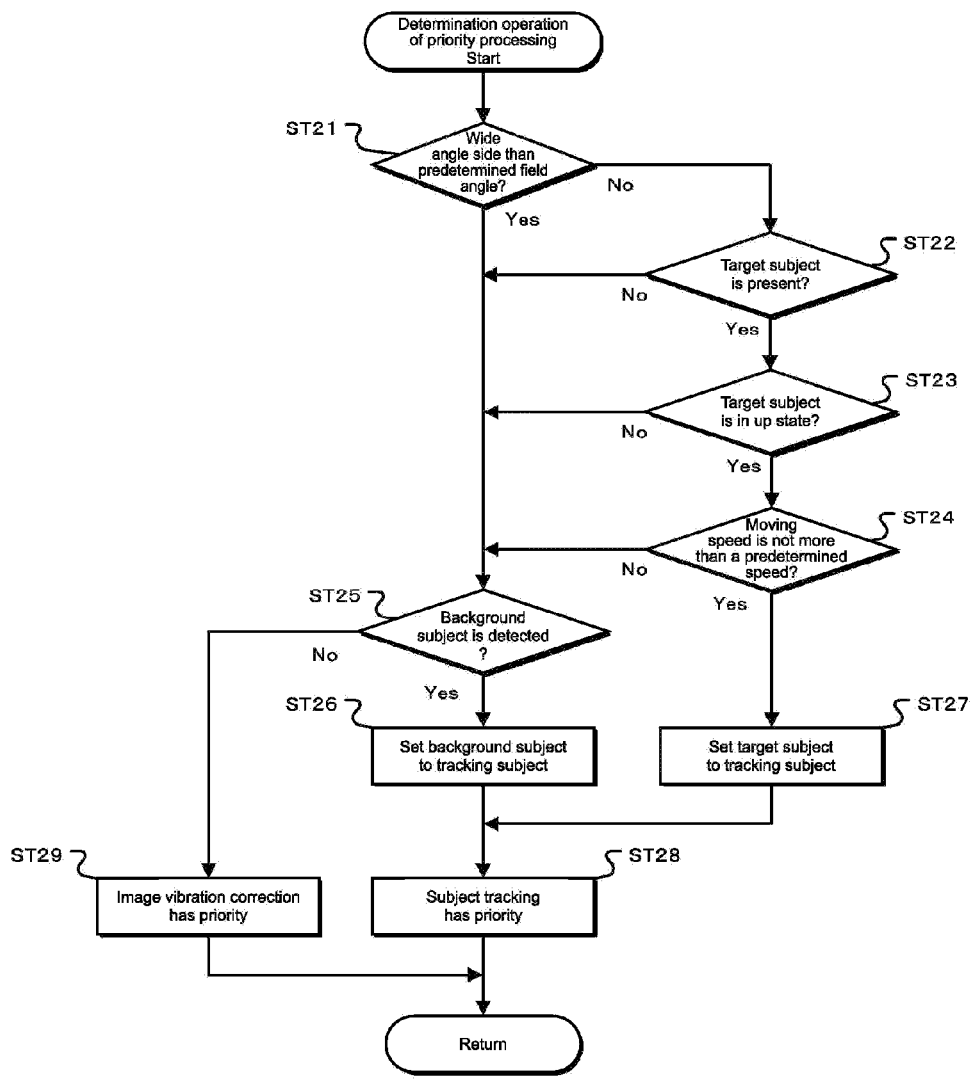
FIG. 11 is a flow chart illustrating other determination operation of priority processing.

Next, other the priority processing determination operation will be described. FIG. 11 is a flow chart illustrating the other operation of the priority processing determination.

In a step ST21, the control unit 90 determines that the zoom position of the image capturing optical system is on the wider angle side than a predetermined field angle. The control unit 90 performs the processing similar to the step ST11. When the current zoom position is not on the wider angle side than the predetermined field angle based on zoom lens position information provided from the lens driving unit 14, the control unit 90 proceeds to a step ST22. When the current zoom position is on the wider angle side than the predetermined field angle, the control unit 90 proceeds to a step ST25.

In the step ST22, the control unit 90 determines whether or not the target subject is present. When the subject recognition result from the image processing unit 61 shows that the target subject is recognized, the control unit 90 proceeds to a step ST23. When the subject recognition result does not show that the target subject is recognized, the control unit 90 proceeds to a step ST25.

In the step ST23, the control unit 90 determines whether or not the target subject is in the up state. The control unit 90 performs the processing similar to the step ST12, and determines whether or not the target subject is in the up state base on the size of the target subject shown by the subject recognition result. When the control unit 90 determines that the target subject is in the up state, the control unit 90 proceeds to a step ST24. When the control unit 90 determines that the target subject is not in the up state, the control unit 90 proceeds to a step ST25.

In the step ST24, the control unit 90 determines whether or not the moving speed of the target subject is not more than a predetermined speed. The control unit 90 performs the processing similar to the step ST13 and calculates the moving speed of the target subject. When the control unit 90 determines that the subject speed calculated is not more than the predetermined speed, the control unit 90 proceeds to a step ST27. When the control unit 90 determines that the subject speed calculated exceeds the predetermined speed, the control unit 90 proceeds to a step ST25.

In the step ST25, the control unit 90 determines whether or not the background subject is detected. When the subject recognition result from the image processing unit 61 shows that the target subject is recognized, the control unit 90 proceeds to a step ST26. When the subject recognition result does not show that the target subject is recognized, the control unit 90 proceeds to a step ST29.

In the step ST26, the control unit 90 sets the background subject to a tracking subject. The background subject recognized at the image processing unit 61 is set to the tracking subject and the control unit 90 proceeds to a step ST28.

In the step ST27, the control unit 90 sets the target subject to the tracking subject. The target subject recognized at the image processing unit 61 is set to the tracking subject and the control unit 90 proceeds to the step ST28.

In the step St28, the control unit 90 determines that the subject tracking has priority. The control unit 90 determines the subject tracking processing that tracks the subject to be tracked set in the step ST26 or the step ST27 has priority, and proceeds to the step ST4 in FIG. 8.

In the step ST29, the control unit 90 determines that the image vibration correction has priority and proceeds to the step ST4 in FIG. 8.

A processing sequence from the steps ST21 through ST24 is not limited to that shown in FIG. 11 and may be changed to other sequences. The processing from the steps ST21 through ST24 may be selectively performed. For example, the processing in the step ST24 may be omitted.

Figure 12A:
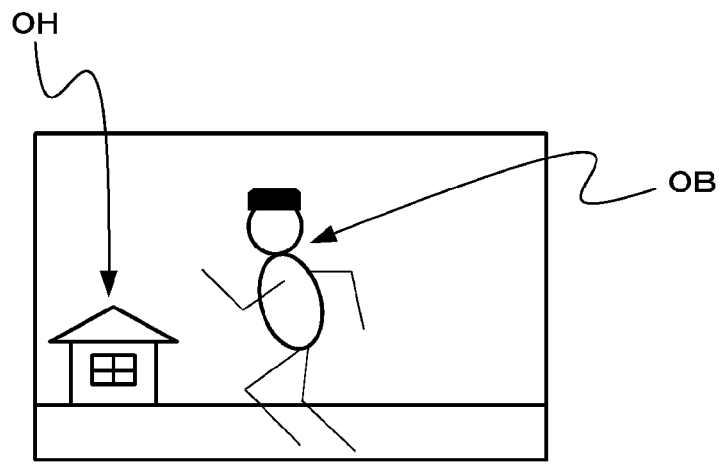
FIGS. 12A and 12B each illustrates the case when the other operation of the priority processing determination is performed.
Figure 12B:
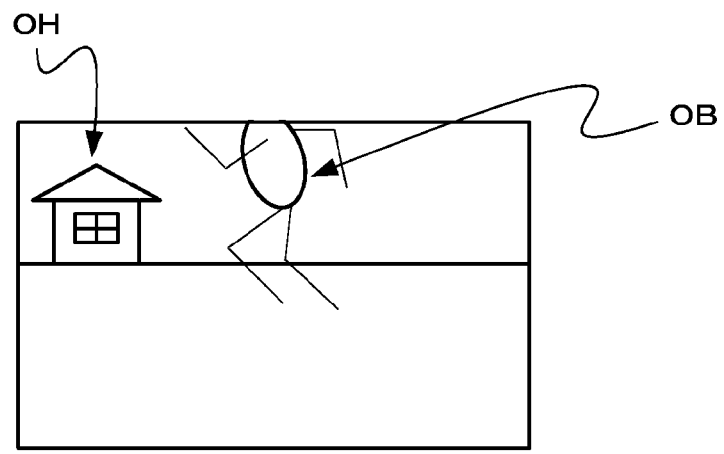

With such an operation, when the field angle is on the wider angle side than the predetermined field angle or the target subject is not detected, the background subject is set to the tacking subject once the background subject is detected. FIGS. 12A and 12B each illustrates the case when the other operation of the priority processing determination is performed. For example, FIGS. 12A and 12B each illustrates the case when a house is recognized as the background subject.

The following case is taken as an example. Namely, the zoom position of the image capturing optical system is on the wider angle side than the predetermined field angle, the image shown in FIG. 12A is provided and the image capturing apparatus is directed downward. In this case, when the tracking operation is not performed on a background subject OH, the image may be such that the image capturing position is moved downward as shown in FIG. 12B. However, when the operation shown in FIG. 11 is performed, the tracking operation is performed on the background subject OH so that the image shown in FIG. 12A can be provided, even if the image capturing apparatus is directed downward.

<4-2. Other Operation of Priority Processing Determination>

In the above-described operation of the priority processing determination, it illustrates that the operation automatically determines the priority order of the subject tracking processing and the image vibration correction processing based on the zoom lens position, the size of the target subject or the like. The priority order of them may be set by the user. The image capturing apparatus displays the menu on the display unit 64 for allowing the user to select the priority order of the subject tracking processing and the image vibration correction processing.

When the user selects the subject tracking processing as the priority processing, the image capturing apparatus limits the adjustment amount in the image vibration correction processing. When the user selects the image vibration correction processing as the priority processing, the adjustment amount in the subject tracking processing is limited. In this way, an image capturing operation can be performed such that the intended processing by the user has priority.

<5. Other Operation of Image Capturing Apparatus>

In the above-described operation of the image capturing apparatus, the PP value of the image vibration correction amount Vsteady in the predetermined period (for example, the certain period just before) is held as the image vibration correction PP value dVs. Taking the image vibration correction PP value held as the image vibration correction amount, the possible adjustment amount of the positioning adjustment mechanism is assigned so that the positioning adjustment of the image vibration correction corresponding amount is performed. However, the image vibration correction corresponding amount is not limited to the PP value of the image vibration correction amount Vsteady in the predetermined period.

For example, a vibration frequency is detected and the period for calculating the image vibration correction PP value dVs based on the detection result may be changed. In this case, when the vibration frequency is high, a subject period for determining the PP value of the image vibration correction amount Vsteady is set short, thereby improving a response to the limit of the subject tracking amount. When the vibration frequency is low, a subject period for determining the PP value of the image vibration correction amount Vsteady is set long, thereby assigning the possible adjustment amount of the positioning adjustment mechanism corresponding to the vibration with certainty.

<6. Tracking Support Operation>

With the above-described operation, as the possible adjustment amount of the positioning adjustment mechanism can be adequately distributed depending on the scenes, it is thus possible to avoid the situation that the image vibration correction becomes suddenly ineffective. However, as the possible adjustment amount is limited, when the target subject moves in a large scale, the target subject may be out of an image capturing range if the user does not move the image capturing apparatus to the moving direction of the target subject.

Therefore, the image capturing apparatus shows discrimination threshold information so that the image capturing apparatus can be moved in the moving direction of the target subject before the possible adjustment amount of the positioning adjustment mechanism reaches the limit. The discrimination threshold information is shown by utilizing the display unit 64 for displaying a live view image, for example. The live view image and the discrimination threshold information are together displayed. In this way, when the discrimination threshold information is displayed, the user can easily confirm the discrimination threshold information during the image capturing operation.

Figure 13A:
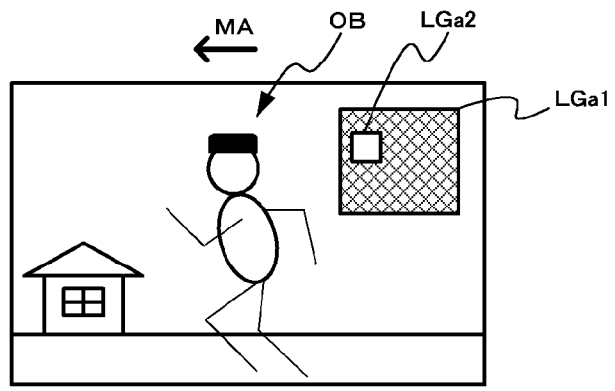
FIGS. 13A, 13B and 13C each shows illustrative discrimination threshold information.
Figure 13B:
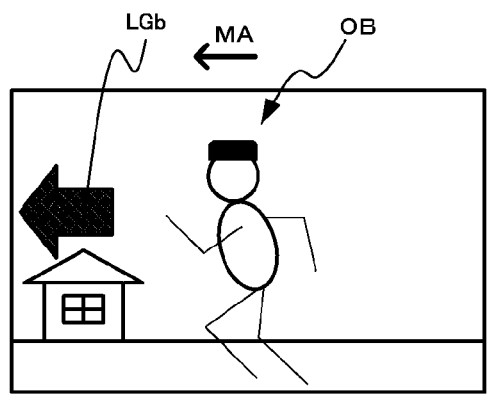
Figure 13C:
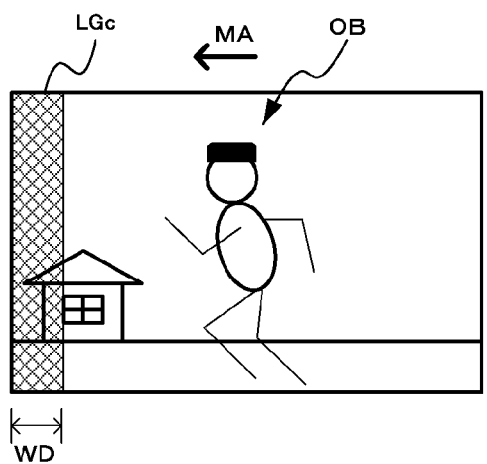

FIGS. 13A, 13B and 13C each shows illustrative discrimination threshold information. When the possible adjustment amount in the tracking direction is lower than the predetermined amount, the control unit 90 displays on the display unit 64 the information that the possible adjustment amount in the tracking direction is lower than the predetermined amount. In FIGS. 13A to 13C, the moving direction of the target subject OB is an arrow MA direction.

FIG. 13A illustrates that the information showing a current positioning is superimposed on the live view image as the discrimination threshold information. When the possible adjustment amount in the tracking direction is lower than the predetermined amount, the control unit 90 displays the discrimination threshold information. The discrimination threshold information includes an image LGa1 showing a possible positioning range and a position indication LGa2 showing the current positioning. In this way, as it is possible to find where the current positioning is in the possible positioning range, the user can easily perceive margins in what direction. Accordingly, the image capturing apparatus and the image capturing direction are moved to the moving direction of the target subject before the possible adjustment amount reaches the limit, whereby the user can continue to track the target subject by the image capturing apparatus.

FIG. 13B illustrates that instruction information showing the moving direction of the image capturing apparatus or the image capturing direction is superimposed on the live view image as the discrimination threshold information. When the possible adjustment amount in the tracking direction is lower than the predetermined amount, the control unit 90 displays the discrimination threshold information. For example, an instruction image LGb showing the moving direction of the image capturing apparatus or the image capturing direction is displayed as the discrimination threshold information so that the possible adjustment amount does not reach the limit.

In this way, when the instruction image LGb is displayed, the user can continue to track the target subject by the image capturing apparatus by moving the image capturing apparatus or the image capturing direction to the direction shown by the instruction image LGb. The control unit 90 may change the length or the color of the arrow of the instruction image LGb depending on the possible adjustment amount. For example, the length of the arrow can be increased and the color of the arrow can be changed to red as the possible adjustment amount is decreased. In this case, the user can determine the rest of the possible adjustment amount by the length and the color of the arrow.

FIG. 13C illustrates that the limit of the possible adjustment amount is displayed by the live view image as the discrimination threshold information. When the possible adjustment amount in the tracking direction is lower than the predetermined amount, the control unit 90 processes the live view image, e.g., changes brightness and intensity of the image LGc within the predetermined range corresponding to the limit of the possible adjustment amount from an end of a limit direction of the possible adjustment amount. In this way, the brightness and the intensity of the image LGc are changed from the end.

In this case, when the image LGc within the predetermined range has the decreased brightness from the end or changes to black and white, the user can continue to track the target subject with the image capturing apparatus by moving the image capturing apparatus or the image capturing direction to the direction of the image LGc. In addition, the control unit 90 may change a width WD of the image LGc from the end depending on the possible adjustment amount. For example, as the possible adjustment amount is decreased, the width WD is widened. In this case, the user can easily determine how an adjustment limit approaches to an area width of the image LGc.

By performing the tracking support operation with the image capturing apparatus, the user can easily move the image capturing apparatus or the image capturing direction to get the possible adjustment amount when the possible adjustment amount of the positioning adjustment mechanism in the tracking direction is decreased. Accordingly, operability of the image capturing apparatus can be improved.

In addition, according to the above-described embodiment, the image capturing apparatus is the video camera. The image capturing apparatus according to the present technology can be applied to any device to perform the subject tracking under the image vibration. For example, the image capturing apparatus according to the present technology may be applied to a car-mounted camera. In this case, when the car running at the front is the target subject, the subject tracking and the image vibration correction are performed, thereby providing a good quality captured image. It is possible to ease control processing for an automatic operation based on the captured image. Furthermore, when the image capturing apparatus according to the present technology is applied to a camera mounted on a ship, a good quality captured image can be provided while performing both of the subject tracking and the image vibration correction, thereby easily monitoring ships therearound.

A series of the processing herein described can be carried out by hardware, software or a combined configuration thereof. When the processing is carried out by software, a program where a processing sequence is stored is installed to a memory in a computer incorporated into dedicated hardware and is executed. It is also possible to install the program to a general-purpose computer being capable of executing a variety of processing.

For example, the program can be stored in advance to a hard disk, a Solid State Drive (SSD) or a Read Only Memory (ROM) as a recording medium. Alternatively, the program can be stored temporarily or permanently to a removable recording medium such as a flexible disk, a Compact Disc Read Only Memory (ROM), a Magneto Optical (MO) disk, a Digital Versatile Disc (DVD), a Blu-Ray Disc (BD)™, a magnetic disk, a semiconductor memory card. These removable recording media can be provided as so-called package software.

The program may be transferred wired or wireless to a computer via a network such as Internet from a download site or a Local Area Network (LAN) other than installed from the removable recording medium to the computer. The computer receives the program transferred in this way, and can install the program to a recording medium such as a built-in hard disk.

Note that the present technology should not be construed by limiting to the above-described embodiments. The various embodiments of the present technology disclosed and described herein are exemplary only. It should be understood by those skilled in the art that various modifications, combinations, sub-combinations and alterations may occur depending on design requirements and other factors insofar as they are within the scope of the appended claims or the equivalents thereof.

The present technology may have the following configurations:

(1) An image capturing apparatus, including:
a positioning adjustment mechanism for performing positioning adjustment of an area image-captured by an image capturing unit;
an image processing unit for recognizing a subject using an image signal generated in the image capturing unit;
a vibration detection unit for detecting vibration of the image capturing apparatus;
a control unit for determining a priority order of subject tracking processing for driving the positioning adjustment mechanism based on a subject recognition result provided from the image processing unit and image vibration correction processing for driving the positioning adjustment mechanism based on a detection result of the vibration detection unit, and for limiting an adjustment amount of the positioning adjustment mechanism for the processing having no priority.

(2) The image capturing apparatus according to (1) above, in which
the control unit gives a priority to processing with a less movement within the captured image provided by the image capturing unit.

(3) The image capturing apparatus according to (2), in which
the control unit determines the priority order of the subject tracking processing and the image vibration correction processing based on at least any of a zoom position of an image capturing optical system, a size of a target subject to be tracked within a captured image recognized at the image processing unit and a moving speed of the target subject.

(4) The image capturing apparatus according to (3) above, in which
the control unit gives priority to the image vibration correction processing when the zoom position of the image capturing optical system is on the wider angle side than a predetermined position and the target subject is not of a predetermined size or more.

(5) The image capturing apparatus according to (3) or (4) above, in which
the control unit gives priority to the image vibration correction processing when the target subject does not have a predetermined moving speed or less.

(6) The image capturing apparatus according to any one of (3) to (5) above, in which
the control unit calculates the moving speed of the target subject based on the speed of the target subject within the captured image and a speed in a subject tracking direction detected at the vibration detection unit.

(7) The image capturing apparatus according to any one of (3) to (6) above, in which
the control unit gives priority to the subject tracking processing taking the subject to be tracked as a background subject recognized at the image processing unit at least one of the cases when the zoom position of the image capturing optical system is on the wider angle side than a predetermined position, when the target subject is not recognized at the image processing unit, when the target subject is not of a predetermined size or more and when the target subject does not have a predetermined moving speed or less.

(8) The image capturing apparatus according to any one of (1) to (7) above, in which the control unit assigns the possible adjustment amount of the positioning adjustment mechanism used in the processing having the priority and assigns the rest of the possible adjustment amount for the other processing such that the positioning adjustment amount of the positioning adjustment mechanism is limited to the processing having no priority.

(9) The image capturing apparatus according to (8) above, in which the control unit performs a limiting processing to a subject tracking amount in the subject tracking processing or an image vibration correction amount in the image vibration correction processing to limit the positioning adjustment amount of the adjustment mechanism to a possible adjustment amount assigned, and drive the positioning adjustment mechanism based on a combined result of the subject tracking amount and the image vibration correction amount after the limiting processing or a combined result of the image vibration correction amount and the subject tracking amount after the limiting process.

(10) The image capturing apparatus according to (8 or (9) above, in which the control unit assigns the possible adjustment amount of the positioning adjustment mechanism based on a vibration detection result of the vibration detection unit in a predetermined period when the image vibration correction processing has priority.

(11) The image capturing apparatus according to (10) above, in which the control unit determines a frequency component of the vibration detection result of the vibration detection unit and sets the length of the predetermined period based on a determination result.

(12) The image capturing apparatus according to any one of (1) to (11) above, further comprising a display unit, in which the control unit displays discrimination threshold information that adjustment limit of the positioning adjustment mechanism is discriminable.

(13) The image capturing apparatus according to (12) above, in which the control unit displays a live view image and the discrimination threshold information together on the display unit.

(14) The image capturing apparatus according to any one of (1) to (13) above, in which the positioning adjustment mechanism performs the positioning adjustment of the image capturing area by adjusting at least one of an image capturing direction of the image capturing optical system and a relative position between a subject optical image formed at the image capturing optical system and the image capturing area in the image capturing unit generating an image signal based on the subject optical image.

It should be understood by those skilled in the art that various modifications, combinations, sub-combinations and alterations may occur depending on design requirements and other factors insofar as they are within the scope of the appended claims or the equivalents thereof.

By the image capturing apparatus, the image capturing method and the program according to the embodiment of the present technology, the positioning adjustment mechanism performs the positioning of the area image-captured by the image capturing unit. In addition, the priority order of the subject tracking processing for driving the positioning adjustment mechanism based on the subject recognition result provided from the image processing unit and the image vibration correction processing for driving the positioning adjustment mechanism based on the vibration detection result of the vibration detection unit is determined and the adjustment amount of the positioning adjustment mechanism for the processing having no priority is limited.

Accordingly, as the adjustment amount of the positioning adjustment mechanism is limited to the subject tracking processing when the image vibration correction has priority, the image vibration correction is possible even if the subject tracking reaches the adjustment limit. When the subject tracking reaches the adjustment limit, the image vibration correction becomes suddenly ineffective, which results in a poor quality captured image. It is thus possible to avoid such phenomenon.

Accordingly, the image capturing apparatus, the image capturing method and the program according to the embodiment of the present technology is suitable for a video camera, a car-mounted camera or the like.

What is claimed is:

1. An image capturing apparatus, comprising:
circuitry configured to:
adjust a position of an image area captured by an image capturing unit, based on at least one of a subject tracking process or an image vibration correction process;
recognize a subject based on an image signal generated in the image capturing unit;
determine a subject recognition result based on the recognized subject;
detect vibration of the image capturing apparatus;
determine a vibration detection result based on the detected vibration of the image capturing apparatus;
determine a priority order of the subject tracking process and the image vibration correction process,
wherein the subject tracking process adjusts the position of the image area by a first adjustment amount, based on the subject recognition result, and
wherein the image vibration correction process adjusts the position of the image area by a second adjustment amount based on the vibration detection result; and
limit at least one of the first adjustment amount or the second adjustment amount based on the priority order of the subject tracking process and the image vibration correction process.

2. The image capturing apparatus according to claim 1, wherein the circuitry is further configured to determine a priority of at least one of the subject tracking process or the image vibration correction process based on movement of the subject within the captured image provided by the image capturing unit.

3. The image capturing apparatus according to claim 2, wherein the circuitry is further configured to determine the priority order of the subject tracking process and the image vibration correction process based on at least one of a zoom position of an image capturing optical system present in the image capturing unit, a size of the subject within the captured image or a moving speed of the subject.

4. The image capturing apparatus according to claim 3, wherein the circuitry is further configured to determine the priority of the image vibration correction process based on at least one of the zoom position of the image capturing optical system that is on an angle side greater than a threshold position and the size of the subject that exceeds a threshold size.

5. The image capturing apparatus according to claim 4, wherein the circuitry is further configured to determine the priority of the image vibration correction process based on the moving speed of the subject that exceeds a threshold moving speed.

6. The image capturing apparatus according to claim 3, wherein the circuitry is further configured to calculate the moving speed of the subject based on a first speed of the subject within the captured image and a second speed in a subject tracking direction detected by the subject tracking process.

7. The image capturing apparatus according to claim 3, wherein the circuitry is further configured to determine the priority of the subject tracking process, in which the subject corresponds to a background in the captured image, based on at least one of the zoom position of the image capturing optical system that is on an angle side greater than a threshold position, failure to recognize the subject at the image capturing unit, the size of the subject is less than a threshold size and the moving speed of the subject is greater than a threshold moving speed.

8. The image capturing apparatus according to claim 1, wherein the circuitry is further configured to assign a first possible adjustment amount to adjust the position of the image area, based on the subject tracking process which has the priority,
wherein the circuitry is further configured to assign a second possible adjustment amount to adjust the position of the image area based on the image vibration correction process which has no priority, and
wherein the first possible adjustment amount is greater than the second possible adjustment amount.

9. The image capturing apparatus according to claim 1, wherein the circuitry is further configured to:
limit, by a limiting process, at least one of the first adjustment amount based on a subject tracking amount in the subject tracking process or the second adjustment amount based on an image vibration correction amount in the image vibration correction process, and adjust the position of the image area based on a combined result of the subject tracking amount and the second adjustment amount after the limiting process or a combined result of the image vibration correction amount and the first adjustment amount after the limiting process.

10. The image capturing apparatus according to claim 1, wherein the circuitry is further configured to assign a value to the second adjustment amount based on the detected vibration of the image capturing apparatus in a period when the image vibration correction process has priority.

11. The image capturing apparatus according to claim 10, wherein the circuitry is further configured to determine a frequency component of the detected vibration to set a length of the period.

12. The image capturing apparatus according to claim 1, further comprising a display unit, wherein the circuitry is further configured to display discrimination threshold information that indicates an adjustment limit of the position of the image area that is discriminable.

13. The image capturing apparatus according to claim 12, wherein the circuitry is further configured to display both a live view image and the discrimination threshold information concurrently on the display unit.

14. The image capturing apparatus according to claim 1, wherein the circuitry is further configured to:
adjust the position of the image area based on at least one of an image capturing direction of the image capturing optical system or a relative position between a subject optical image formed at the image capturing optical system and the image area captured in the image capturing unit, and
generate an image signal based on the subject optical image.

15. A method of capturing an image, comprising:
adjusting a position of an image area captured by an image capturing unit based on at least one of a subject tracking processing or an image vibration correction processing;
recognizing a subject based on an image signal generated in the image capturing unit;
determining a subject recognition result based on the recognized subject;
detecting vibration of the image capturing unit;
determining a vibration detection result based on the detected vibration of the image capturing unit;
determining a priority order of the subject tracking processing and image vibration correction processing,
wherein the subject tracking processing adjusts the position of the image area by a first adjustment amount, based on the subject recognition result, and
wherein the image vibration correction processing adjusts the position of the image area by a second adjustment amount, based on the vibration detection result; and
limiting at least one of the first adjustment amount or the second adjustment amount based on the priority order of the subject tracking processing and the image vibration correction processing.

16. A non-transitory computer-readable storage medium having stored thereon computer-executable instructions that, when executed by a processor, cause a computer to perform operations, the operations comprising:
adjusting a position of an image area captured by an image capturing unit based on at least one of a subject tracking processing or an image vibration correction processing;
recognizing a subject based on an image signal generated in the image capturing unit;
determining a subject recognition result based on the recognized subject;
detecting vibration of the image capturing unit;
determining a vibration detection result based on the detected vibration of the image capturing unit;
determining a priority order of the subject tracking processing and image vibration correction processing,
wherein the subject tracking processing adjusts the position of the image area by a first adjustment amount, based on the subject recognition result, and
wherein the image vibration correction processing adjusts the position of the image area by a second adjustment amount, based on the vibration detection result; and limiting at least one of the first adjustment amount or the second adjustment amount based on the priority order of the subject tracking processing and the image vibration correction processing.

17. An image capturing apparatus, comprising:
    circuitry configured to:
    adjust a position of an image area captured by an image capturing unit based on at least one of a subject tracking process or an image vibration correction process;
    recognize a subject based on an image signal generated in the image capturing unit;
    determine a subject recognition result based on the recognized subject;
    detect vibration of the image capturing apparatus;
    determine a vibration detection result based on the detected vibration of the image capturing apparatus;
    determine a priority order of the subject tracking process and the image vibration correction process,
        wherein the subject tracking process adjusts the position of the image area by a first adjustment amount, based on the subject recognition result, and
        wherein the image vibration correction process adjusts the position of the image area by a second adjustment amount, based on the vibration detection result; and
    limit at least one of the first adjustment amount or the second adjustment amount based on the priority order of the subject tracking process and the image vibration correction process; and
    determine a priority of the image vibration correction process based on a moving speed of the subject that exceeds a threshold moving speed.

* * * * *